US008666243B2

(12) United States Patent
Sugiyama et al.

(10) Patent No.: US 8,666,243 B2
(45) Date of Patent: Mar. 4, 2014

(54) OPTICAL TRANSMISSION DEVICE, OPTICAL TRANSMISSION METHOD, AND RECORDING MEDIUM THEREOF

(75) Inventors: Seiji Sugiyama, Fukuoka (JP); Akira Yamamoto, Fukuoka (JP); Makoto Ohtou, Fukuoka (JP); Koji Bato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1363 days.

(21) Appl. No.: 12/010,877

(22) Filed: Jan. 30, 2008

(65) Prior Publication Data
US 2008/0292318 A1    Nov. 27, 2008

(30) Foreign Application Priority Data

Jan. 30, 2007    (JP) .................................. 2007-020071

(51) Int. Cl.
*H04B 10/07*    (2013.01)
(52) U.S. Cl.
USPC .......................................................... 398/16
(58) Field of Classification Search
USPC .................................................. 398/16, 173
See application file for complete search history.

(56) References Cited

U.S. PATENT DOCUMENTS

| 7,027,210 | B2* | 4/2006 | Tian et al. ...................... 359/333 |
| 7,394,980 | B1* | 7/2008 | Richards .......................... 398/16 |
| 7,561,798 | B2* | 7/2009 | Kokkinos ......................... 398/31 |
| 2005/0158057 | A1* | 7/2005 | Tomofuji et al. ............. 398/160 |
| 2006/0044645 | A1* | 3/2006 | Charlet et al. ................. 359/333 |

FOREIGN PATENT DOCUMENTS

| JP | 2004-23437 | 1/2004 |
| JP | 2006-229698 | 8/2006 |

* cited by examiner

*Primary Examiner* — Shi K Li
(74) *Attorney, Agent, or Firm* — Staas & Halsey LLP

(57) ABSTRACT

An optical transmission device that is installed at a node of a network and that performs transmission of an optical signal transmits the optical signal to an optical transmission device at the next node without amplifying the optical signal. The optical transmission device generates an adjustment optical signal used by a reception-side optical amplifier in the optical transmission device at the next node to adjust gain for a transmission loss of the optical signal. At the time of booting of the optical transmission device, the optical transmission device transmits the generated adjustment optical signal to the reception-side optical amplifier in the optical transmission device at the next node. Upon receiving a gain-adjustment-completion signal for notifying completion of gain adjustment using the adjustment optical signal from the reception-side optical amplifier, the optical transmission device controls the transmission of the adjustment optical signal to be stopped.

9 Claims, 13 Drawing Sheets

OPTICAL TRANSMISSION DEVICE, OPTICAL TRANSMISSION METHOD, AND RECORDING MEDIUM THEREOF

BACKGROUND OF THE INVENTION

1. Field of the Invention

The present invention relates to an optical transmission device, an optical transmission method, and an recording medium storing an optical transmission program.

2. Description of the Related Art

With an expansion of a demand for broadband communication due to widespread use of the Internet, it has been demanded to transmit large-volume data over a long distance in the optical communication network. To this end, an optical transmission system, in which an optical transmission device employing the WDM (Wavelength Division Multiplex) technology is installed at each node of a network, is put to practical use.

In optical transmission devices employing the WDM technology, since a plurality of optical signals in different wavelengths are multiplexed and transmitted, on a single optical fiber cable, to an optical transmission device at the next node, it is possible to increase transmission capacity per optical fiber cable.

In addition, in optical transmission devices employing the WDM technology, since a gain adjustment technique for detecting attenuation (transmission loss) of a multiplexed optical signal caused during transmission between optical transmission devices and for correcting the level of the received optical signal is further employed, it is possible to prevent the received optical signal from degrading and to transmit large-volume data over a long distance.

Now, to describe gain adjustment, the above-described optical transmission device will be described formally using FIG. 13. FIG. 13 is a diagram for describing a conventional optical transmission device.

As shown in FIG. 13, the conventional optical transmission device is connected to a previous-node optical transmission device that is installed at the previous node of the optical transmission device, and to a next-node optical transmission device that is installed at the next node of the optical transmission device. In addition, the previous-node optical transmission device and the next-node optical transmission device are configured in a manner similar to that of the optical transmission device shown in FIG. 13.

A reception-side optical amplifier AR11 receives a multiplexed optical signal transmitted from the previous-node optical transmission device through a transmission path F01, automatically performs gain adjustment on the received optical signal, and sends the gain-adjusted optical signal to a wavelength demultiplexing section D11. Meanwhile, gain adjust will be described in detail later.

The wavelength demultiplexing section D11 demultiplexes the gain-adjusted optical signal received from the reception-side optical amplifier AR11, and sends the demultiplexed optical signals to an optical switch S11. More specifically, the wavelength demultiplexing section demultiplexes the supplied multiplexed optical signal for each wavelength. For example, in transmission of an optical signal using 40 C-band wavelengths, the wavelength demultiplexing section D11 demultiplexes an optical signal, into which 40 waves having 40 different kinds of wavelengths are multiplexed, to optical signals having 40 different kinds of wavelengths.

The optical switch S11 receives the demultiplexed optical signals output by the wavelength demultiplexing section D11 and receives optical signals from a client terminal that a wavelength converting section T12, which will be described later, has received. The optical switch is a matrix switch that performs switching of a path for transmission to a wavelength converting section T11, which will be described later, and performs switching of a path for transmission to a wavelength multiplexing section M11, which will be described later, on the basis of information for each of these received optical signals.

The wavelength converting section T11 converts the wavelength of the optical signals received through the optical switch S11, and sends the converted signals to a client terminal. In addition, the wavelength converting section T12 converts an optical signal in a broadband wavelength received from a client terminal into an optical signal in a narrowband wavelength. In addition, the wavelength converting section T11 and the wavelength converting section T12 include a laser diode.

The wavelength multiplexing section M11 multiplexes the optical signals received through the optical switch S11, and sends the multiplexed optical signal to a transmission-side optical amplifier AS11. For example, in transmission of an optical signal using 40 C-band wavelengths, the wavelength multiplexing section M11 multiplexes optical signals having 40 different kinds of wavelengths.

The transmission-side optical amplifier AS11 amplifies an optical level of the multiplexed optical signal received from the wavelength multiplexing section M11 to a necessary optical level, and transmits the amplified optical signal to the next-node optical transmission device through a transmission path F12.

In addition, opposite to the above-described path, a reception-side optical amplifier AR12 receives a multiplexed optical signal transmitted from the next-node optical transmission device through a transmission path F21, automatically performs gain adjustment on the received optical signal, and sends the gain-adjusted optical signal to a wavelength demultiplexing section D12.

The wavelength demultiplexing section D12 demultiplexes the gain-adjusted optical signal received from the reception-side optical amplifier AR12, and sends the demultiplexed optical signals to an optical switch S12.

The optical switch S12 receives the demultiplexed optical signals output by the wavelength demultiplexing section D12 and receives optical signals from a client terminal that a wavelength converting section T14, which will be described later, has received. The optical switch is a matrix switch that performs switching of a path for transmission to a wavelength converting section T13, which will be described later, and performs switching of a path for transmission to a wavelength multiplexing section M12, which will be described later, on the basis of information for each of these received optical signals.

The wavelength converting section T13 converts the wavelength of the optical signals received through the optical switch, and sends the converted signals to a client terminal. In addition, the wavelength converting section T14 converts an optical signal in a broadband wavelength received from a client terminal into an optical signal in a narrowband wavelength.

The wavelength multiplexing section M12 multiplexes the optical signals received through the optical switch S12, and sends the multiplexed optical signal to a transmission-side optical amplifier AS12.

The transmission-side optical amplifier AS12 amplifies an optical level of the multiplexed optical signal received from the wavelength multiplexing section M12 to a necessary optical level, and transmits the amplified optical signal to the previous-node optical transmission device through a transmission path F10.

In addition, an OSC unit OS12 (OSC: Optical Supervisory Channel) performs information exchange between the previous-node optical transmission device and the optical transmission device through an optical coupler C11 and an optical coupler C14. An OSC unit OS11 performs information exchange between the optical transmission device and the next-node optical transmission device through an optical coupler C12 and an optical coupler C13.

An optical transmission device having such a configuration performs automatic setting of gain adjustment at the time of construction of a new optical communication network, installment of an optical transmission device at a new node, and addition of a part of an optical transmission device.

More specifically, at the time of booting of the previous-node optical transmission device, an adjustment optical signal is transmitted from the previous-node optical transmission device to the reception-side optical amplifier AR11. For example, the previous-node optical transmission device transmits a wave output from a laser diode, included in a wavelength converting section (corresponding to the wavelength converting section T12 shown in FIG. 13) implemented in the previous-node optical transmission device, to the reception-side optical amplifier AR11 as an adjustment optical signal. The reception-side optical amplifier AR11 detects an optical level of the adjustment optical signal received from the transmission path F01, and detects a transmission loss on the basis of an amount of attenuation calculated from the optical level.

By means of this, the reception-side optical amplifier AR11 automatically performs setting of gain adjustment necessary for amplifying an optical level of an optical signal received from the previous-node optical transmission device thereafter with reference to the transmission loss of the detected adjustment optical signal.

In addition, Japanese Unexamined Patent Application Publication No. 2004-23437 discloses a method for automatically performing gain adjustment in a reception optical amplifier at the next node by outputting ASE (Amplified Spontaneous Emission) light of a transmission-side optical amplifier as an adjustment optical signal. For example, ASE light output from the transmission-side optical amplifier AS11 shown in FIG. 13 is transmitted to the reception-side optical amplifier of the next-node optical transmission device through the transmission path F12. The reception-side optical amplifier detects the optical level of the received ASE light to detect a transmission loss on the basis of an amount of attenuation calculated from the optical level.

Meanwhile, the above-described conventional optical transmission device has a problem that a cost for equipment investment is high when short-and-intermediate-distance optical signal transmission is performed.

SUMMARY

In the case that an inter-node distance is a short-and-intermediate distance, amplification of an optical level of an optical signal by a transmission-side optical amplifier at the time of transmission of the optical signal is not mandatory. In addition, in a conventional optical transmission device, a cost for optical amplifiers of a transmission-side optical amplifier and a reception-side optical amplifier is large. Furthermore, with respect to power consumption of an optical transmission device, the power consumed by optical amplifiers is the largest. Due to this, there is a demand for elimination of a transmission-side optical amplifier in an optical transmission device that performs short-and-intermediate-distance optical signal transmission.

However, in a technique of the above-mentioned Japanese Unexamined Patent Application Publication No. 2004-23437, since reception-side gain adjustment utilizing ASE light output by a transmission-side optical amplifier is performed, the transmission-side optical amplifier cannot be eliminated. For this reason, there is a problem that a cost for equipment investment of an optical transmission device that perform short-and-intermediate-distance optical signal transmission.

Accordingly, this invention is made to solve the above-described problems in the conventional technology and aims to provide an optical transmission device, an optical transmission method, and an optical transmission program that can restrain the cost for equipment investment of an optical transmission device. The optical transmission device provided by the invention is preferable for use as a short-and-intermediate distance optical signal transmission device.

To solve the above-described problems and to achieve the objects, an aspect of the invention is an optical transmission device that is installed at a node of a network and that performs transmission of an optical signal. The optical transmission device is characterized by including: transmission means for transmitting the optical signal to an optical transmission device at the next node without amplifying the optical signal; adjustment optical signal generating means for generating an adjustment optical signal used by a reception-side optical amplifier in the optical transmission device at the next node to adjust gain for a transmission loss of the optical signal; and adjustment optical signal transmission controlling means for controlling the transmission means to transmit the adjustment optical signal generated by the adjustment optical signal generating means to the reception-side optical amplifier in the optical transmission device at the next node, and to stop transmission of the adjustment optical signal when the optical transmission device receives, from the reception-side optical amplifier, a gain-adjustment-completion signal for notifying completion of gain adjustment using the adjustment optical signal. The adjustment optical signal is preferable to be generated at the time of booting of the optical transmission device.

In addition, another aspect of the invention provides an optical transmission method that is installed at a node of a network and that performs transmission of an optical signal. The optical transmission method is characterized by including: a transmission step of transmitting the optical signal to an optical transmission device at the next node without amplifying the optical signal; an adjustment optical signal generating step of generating an adjustment optical signal used by a reception-side optical amplifier in the optical transmission device at the next node to adjust gain for a transmission loss of the optical signal; and an adjustment optical signal transmission controlling step of controlling transmission so that the adjustment optical signal generated at the adjustment optical signal generating step is transmitted to the reception-side optical amplifier in the optical transmission device at the next node, and so that transmission of the adjustment optical signal is stopped when the optical transmission device receives, from the reception-side optical amplifier, a gain-adjustment-completion signal for notifying completion of gain adjustment using the adjustment optical signal. The adjustment optical signal is preferable to be generated at the time of booting of the optical transmission device.

Further aspect of the invention provides an optical transmission program causing a computer serving as an optical transmission device that is installed at a node of a network and that performs transmission of an optical signal to execute an optical transmission method. The optical transmission method is characterized by including: a transmission step of transmitting the optical signal to an optical transmission device at the next node without amplifying the optical signal; an adjustment optical signal generating step of generating an adjustment optical signal used by a reception-side optical amplifier in the optical transmission device at the next node to adjust gain for a transmission loss of the optical signal; and an adjustment optical signal transmission controlling step of controlling transmission so that the adjustment optical signal generated at the adjustment optical signal generating step is transmitted to the reception-side optical amplifier in the optical transmission device at the next node, and so that transmission of the adjustment optical signal is stopped when the optical transmission device receives, from the reception-side optical amplifier, a gain-adjustment-completion signal for notifying completion of gain adjustment using the adjustment optical signal. The adjustment optical signal is preferable to be generated at the time of booting of the optical transmission device.

DESCRIPTION OF THE PREFERRED EMBODIMENTS

Figure 1:
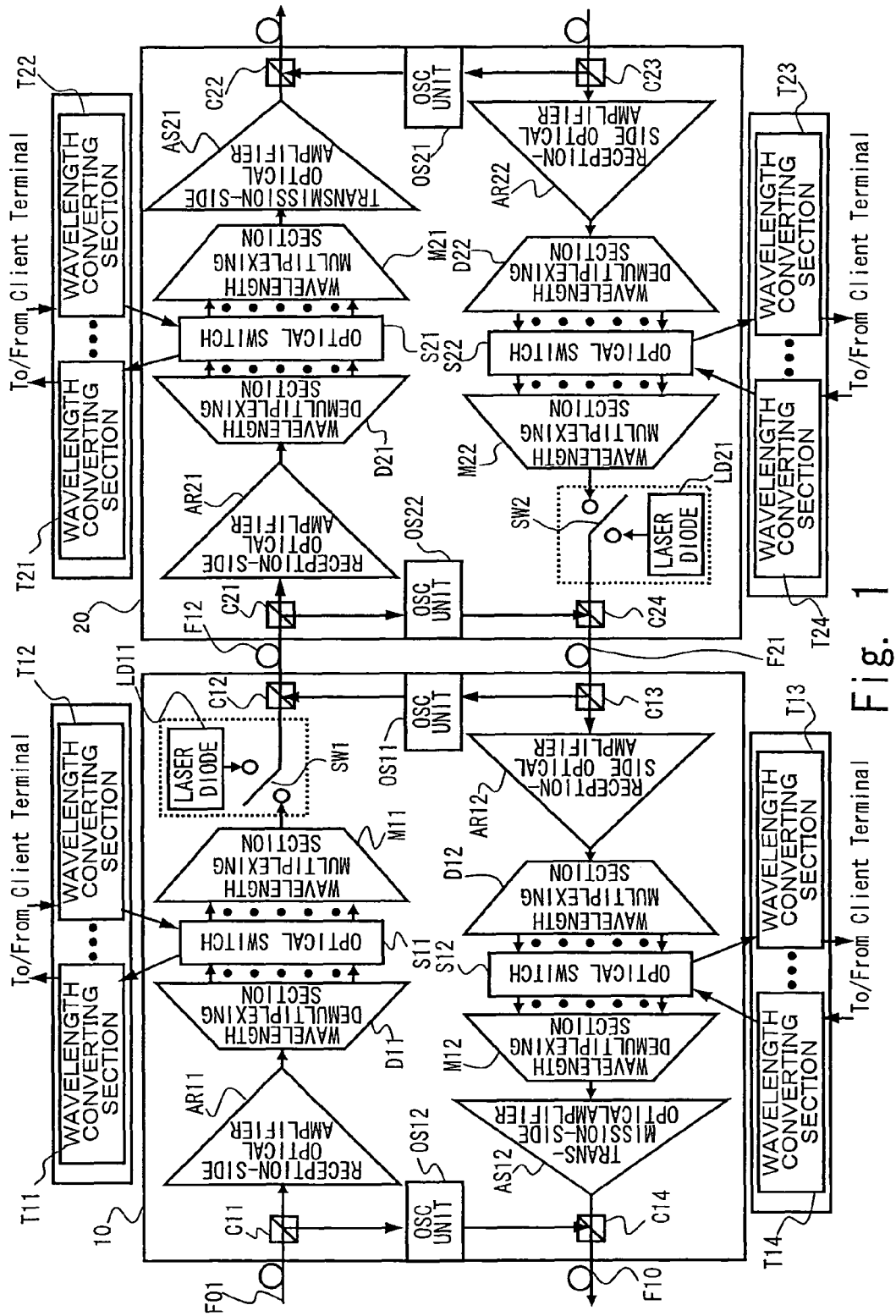
FIG. 1 shows an illustrated diagram for describing an overview and features of a first embodiment of the invention.

The present invention may provide, besides the above-described embodiments, an optical transmission device further includes: a laser diode, and wherein the adjustment optical signal generating means generates the adjustment optical signal with the laser diode, and wherein the adjustment optical signal transmission controlling means transmits the adjustment optical signal generated by the laser diode to the reception-side optical amplifier in the optical transmission device at the next node.

Additionally, the invention may provide the adjustment optical signal generating means that generates the adjustment optical signal with a reception-side optical amplifier in the optical transmission device, and wherein the adjustment optical signal transmission controlling means transmits the adjustment optical signal generated by the reception-side optical amplifier of the optical transmission device to the reception-side optical amplifier in the optical transmission device at the next node.

Furthermore, the invention may provide an optical transmission device further includes: a wavelength-converting laser diode, wherein the adjustment optical signal generating means generates a plurality of adjustment optical signals having different wavelengths with the wavelength-converting laser diode, and wherein the adjustment optical signal transmission controlling means transmits each of the plurality of adjustment optical signals generated by the wavelength-converting laser diode to the reception-side optical amplifier in the optical transmission device at the next node, and stops transmission of the adjustment optical signals when the optical transmission device receives the gain-adjustment-completion signal corresponding to the transmitted adjustment optical signal.

More over, the invention may provide an optical transmission device further includes: a wavelength-independent wavelength multiplexing section, wherein the adjustment optical signal generating means generates a plurality of adjustment optical signals having different wavelengths with the variable-wavelength laser diode of a wavelength converting section included in the optical transmission device, and wherein the adjustment optical signal transmission controlling means transmits each of the plurality of adjustment optical signals generated by the variable-wavelength laser diode of the wavelength converting section included in the optical transmission device to the reception-side optical amplifier in the optical transmission device at the next node through the wavelength-independent wavelength multiplexing section, and stops transmission of the adjustment optical signals when the optical transmission device receives the gain-adjustment-completion signal corresponding to the transmitted adjustment optical signal.

According to some of the embodiments, an optical signal is transmitted to an optical transmission device at the next node without being amplified. An adjustment optical signal used by a reception-side optical amplifier in the optical transmission device at the next node to adjust gain for a transmission loss of the optical signal is generated. At the time of booting of the optical transmission device, transmission is controlled so that the generated adjustment optical signal is transmitted to the reception-side optical amplifier in the optical transmission device at the next node. When the optical transmission device receives, from the reception-side optical amplifier, a gain-adjustment-completion signal for notifying completion of gain adjustment using the adjustment optical signal, the transmission is controlled so that transmission of the adjustment optical signal is stopped. Accordingly, even if a transmission-side optical amplifier conventionally provided in an optical transmission device is removed, the reception-side optical amplifier at the next node can receive the adjustment optical signal and adjust the gain for the transmission loss, thus it is possible to restrain the cost for equipment investment of an optical transmission device that performs short-and-intermediate-distance optical signal transmission.

In addition, it will be provided that an optical transmission device further includes a laser diode, and generates an adjustment optical signal with the laser diode, and transmits the adjustment optical signal generated by the laser diode to a reception-side optical amplifier in an optical transmission device at the next node. Accordingly, even if a transmission-side optical amplifier conventionally provided in an optical transmission device is removed, by providing a low-cost laser diode, the reception-side optical amplifier at the next node can receive the adjustment optical signal from the laser diode and adjust the gain for the transmission loss, thus it is possible to restrain the cost for equipment investment of an optical transmission device that performs short-and-intermediate-distance optical signal transmission.

Additionally, it is provided that an adjustment optical signal is generated by a reception-side optical amplifier of an optical transmission device, the adjustment optical signal generated by the reception-side optical amplifier of the optical transmission device is transmitted to a reception-side optical amplifier in an optical transmission device at the next node. Accordingly, even if a transmission-side optical amplifier conventionally provided in an optical transmission device is removed, the reception-side optical amplifier at the next node can receive the adjustment optical signal from the reception-side optical amplifier of the optical transmission device and adjust the gain for the transmission loss, thus it is possible to further restrain the cost for equipment investment of an optical transmission device that performs short-and-intermediate-distance optical signal transmission.

Furthermore, an embodiment of an optical transmission device further includes a wavelength-converting laser diode. A plurality of adjustment optical signals having different wavelengths is generated by the wavelength-converting laser diode. Each of the plurality of adjustment optical signals generated by the wavelength-converting laser diode is transmitted to the reception-side optical amplifier in the optical transmission device at the next node. Transmission of the adjustment optical signals is stopped when the optical transmission device receives the gain-adjustment-completion signal corresponding to the transmitted adjustment optical signal. Accordingly, even if a transmission-side optical amplifier conventionally provided in an optical transmission device is removed, by providing a low-cost wavelength-converting laser diode, the reception-side optical amplifier at the next node can receive the plurality of adjustment optical signals from the wavelength-converting laser diode and adjust the gain for the transmission loss, thus it is possible to restrain the cost for equipment investment of an optical transmission device that performs short-and-intermediate-distance optical signal transmission. Additionally, it is possible to perform gain adjustment on each of the plurality of adjustment optical signals having different wavelengths from the wavelength-converting laser diode, which enables highly-reliable gain adjustment that compensates the optical level for each wavelength.

Moreover, an optical transmission device further includes a wavelength-independent wavelength multiplexing section. A plurality of adjustment optical signals having different wavelengths is generated by the variable-wavelength laser diode of a wavelength converting section included in the optical transmission device. Each of the plurality of adjustment optical signals generated by the variable-wavelength laser diode of the wavelength-converting section included in the optical transmission device is transmitted to the reception-side optical amplifier in the optical transmission device at the next node through the wavelength-independent wavelength multiplexing section. Transmission of the adjustment optical signals is stopped when the optical transmission device receives the gain-adjustment-completion signal corresponding to the transmitted adjustment optical signal. Accordingly, even if a transmission-side optical amplifier conventionally provided in an optical transmission device is removed, the reception-side optical amplifier at the next node can receive the plurality of adjustment optical signals from the variable-wavelength laser diode of the wavelength-converting section included in the optical transmission device and adjust the gain for the transmission loss, thus it is possible to further restrain the cost for equipment investment of an optical transmission device that performs short-and-intermediate-distance optical signal transmission. Additionally, it is possible to perform gain adjustment on each of the plurality of adjustment optical signals having different wavelengths from the variable-wavelength laser diode, which enables highly-reliable gain adjustment that compensates the optical level for each wavelength.

Details of embodiments are shown below.

Optical transmission devices, optical transmission methods, and optical transmission programs according to this invention will be described in detail below with reference to the attached drawings. In the following, optical transmission devices to which the present invention is applied will be described as embodiments. In addition, in the following, a configuration, a procedure of processing of an optical transmission device in an embodiment 1, and advantages of the embodiment 1 will be sequentially described. Then, as in the case of the embodiment 1, an optical transmission device according to an embodiment 2, an optical transmission device according to an embodiment 3, an optical transmission device according to an embodiment 4, and an optical transmission device according to an embodiment 5 will be sequentially described. Lastly, other embodiments will be described.

Embodiment 1

Overview and Features of Optical Transmission Device in Embodiment 1

Firstly, using FIG. 1, major features of an optical transmission device in an embodiment 1 will be described specifically. FIG. 1 is a diagram for describing an overview and features of the optical transmission device in the embodiment 1.

The optical transmission device in the embodiment 1 is installed at a node of a network and generally performs transmission of optical signals. For example, as shown in FIG. 1, a first optical transmission device 10 performs transmission of optical signals with a second optical transmission device 20 installed at the next node. In addition, the first optical transmission device 10 also performs transmission of optical signals with an optical transmission device, not shown, at the previous node. The second optical transmission device 20 also performs transmission of optical signals with an optical transmission device, not shown, at the next node. Additionally, in FIG. 1, an inter-node distance between the first optical transmission device 10 and the second optical transmission device 20 is a short-and-intermediate distance (for example, several tens kilometers), and an inter-node distance between the first optical transmission device 10 and the optical transmission device at the previous node and an inter-node distance between the second optical transmission device 20 and the optical transmission device at the next node are a long distance (for example, several hundreds kilometers).

As shown in FIG. 1, a reception-side optical amplifier AR11 in the first optical transmission device 10 receives a multiplexed optical signal transmitted from the optical transmission device at the previous node through a transmission path F01, automatically performs gain adjustment on the received optical signal, and sends the gain-adjusted optical signal to a wavelength demultiplexing section D11.

The wavelength demultiplexing section D11 demultiplexes the gain-adjusted optical signal received from the reception-side optical amplifier AR11, and sends the demultiplexed optical signals to an optical switch S11. More specifically, the wavelength demultiplexing section demultiplexes the supplied multiplexed optical signal for each wavelength. For example, in transmission of an optical signal using 40 C-band wavelengths, the wavelength demultiplexing section D11 demultiplexes an optical signal, into which 40 waves having 40 different kinds of wavelengths are multiplexed, into optical signals having 40 different kinds of wavelengths.

The optical switch S11 receives the demultiplexed optical signals output by the wavelength demultiplexing section D11 and receives optical signals from a client terminal that a wavelength converting section T12, which will be described later, has received. The optical switch is a matrix switch that performs switching of a path for transmission to a wavelength converting section T11, which will be described later, and performs switching of a path for transmission to a wavelength multiplexing section M11, which will be described later, on the basis of information for each of these received optical signals.

The wavelength converting section T11 converts the wavelength of the optical signals received through the optical switch S11, and transmits the converted signals to the client terminal. In addition, the wavelength converting section T12 converts an optical signal in a broadband wavelength received from the client terminal into an optical signal in a narrowband wavelength. In addition, the wavelength converting section T11 and the wavelength converting section T12 include a laser diode.

The wavelength multiplexing section M11 multiplexes the optical signals received through the optical switch S11, and transmits the multiplexed optical signal to the optical transmission device at the next node through a transmission path F12. For example, in transmission of an optical signal using 40 C-band wavelengths, the wavelength multiplexing section M11 multiplexes optical signals in 40 different kinds of wavelengths.

In addition, opposite to the above-described path, a reception-side optical amplifier AR12 receives a multiplexed optical signal transmitted from the next-node optical transmission device through a transmission path F21, automatically performs gain adjustment on the received optical signal, and sends the gain-adjusted optical signal to a wavelength demultiplexing section D12.

The wavelength demultiplexing section D12 demultiplexes the gain-adjusted optical signal received from the reception-side optical amplifier AR12, and sends the demultiplexed optical signals to an optical switch S12.

The optical switch S12 receives the demultiplexed optical signals output by the wavelength demultiplexing section D12 and receives optical signals from a client terminal that a wavelength converting section T14, which will be described later, has received. The optical switch is a matrix switch that performs switching of a path for transmission to a wavelength converting section T13, which will be described later, and performs switching of a path for transmission to a wavelength multiplexing section M12, which will be described later, on the basis of information for each of these received optical signals.

The wavelength converting section T13 converts the wavelength of the optical signals received through the optical switch, and sends the converted signals to a client terminal. In addition, the wavelength converting section T14 converts an optical signal in a broadband wavelength received from a client terminal into an optical signal in a narrowband wavelength.

The wavelength multiplexing section M12 multiplexes the optical signals received through the optical switch S12, and sends the multiplexed optical signal to a transmission-side optical amplifier AS12.

The transmission-side optical amplifier AS12 amplifies an optical level of the multiplexed optical signal received from the wavelength multiplexing section M12 to an optical level necessary for the transmission, and transmits the amplified optical signal to the previous-node optical transmission device through a transmission path F10.

In addition, an OSC unit OS12 performs information exchange between the previous-node optical transmission device and the optical transmission device through an optical coupler C11 and an optical coupler C14. An OSC unit OS11 performs information exchange between the optical transmission device and the next-node optical transmission device through an optical coupler C12 and an optical coupler C13.

A configuration and a function of each section in the second optical transmission device 20 shown in FIG. 1 are similar to the configuration and the function of each section in the first optical transmission device 10, thus description thereof is omitted.

The present invention is mainly characterized in that a cost for equipment investment of an optical transmission device that performs short-and-intermediate-distance optical signal transmission is kept low. To briefly describe this major feature, the optical transmission device in the embodiment 1 transmits an optical signal to an optical transmission device at the next node without amplifying the optical signal.

More specifically, the optical transmission device in the embodiment 1 transmits a multiplexed optical signal to the next-node optical transmission device without amplifying an optical level of the multiplexed optical signal to an optical level necessary for the transmission in the case of performing short-and-intermediate-distance optical signal transmission. For example, as shown in FIG. 1, in the first optical transmission device 10, a transmission-side optical amplifier conventionally provided between the wavelength multiplexing section M11 and the optical coupler C12 is removed. In the second optical transmission device 20, a transmission-side optical amplifier conventionally provided between the wavelength multiplexing section M22 and the optical coupler C24 is removed.

With this configuration, the first optical transmission device 10 transmits an optical signal to the second optical transmission device 20 at a short-and-intermediate distance through a path connected from the wavelength multiplexing section M11 though the switch SW1, described later. In addition, the second optical transmission device 20 transmits an optical signal to the first optical transmission device 10 at a short-and-intermediate distance through a path connected from the wavelength multiplexing section M22 through a switch SW2, described later.

The first optical transmission device 10 transmits an optical signal amplified by the transmission-side optical amplifier AS12 to the previous-node optical transmission device at a long distance as before. The second optical transmission device 20 transmits an optical signal amplified by the transmission-side optical amplifier AS21 to the next-node optical transmission device at a long distance as before.

Additionally, the optical transmission device in the embodiment 1 generates an adjustment optical signal used by a reception-side optical amplifier in the optical transmission device at the next node to adjust the gain for a transmission loss of the optical signal. More specifically, a laser diode capable of outputting the optical level corresponding to one wave as an adjustment optical signal is provided in the optical transmission device. For example, as shown in FIG. 1, a laser diode LD11 is provided in the first optical transmission device 10, and a laser diode LD21 is provided in the second optical transmission device 20. The laser diode LD11 and the laser diode LD21 correspond to "adjustment optical signal generating means."

Then, an optical transmission device in the embodiment 1 controls to transmit an adjustment optical signal generated by a laser diode to a reception-side optical amplifier in an optical transmission device at the next node at the time of booting of the optical transmission device. More specifically, the first optical transmission device 10 shown in FIG. 1 gives the laser diode LD11 an instruction to generate an adjustment optical signal, and also issues an instruction to switch connection of the switch SW1 in order to transmit the adjustment optical signal generated by the laser diode LD11 to the reception-side optical amplifier AR21 in the second optical transmission device 20 through the transmission path F12 at the time of booting thereof, such as construction of a new optical communication network, installment of an optical transmission device at a new node, and addition of a new part of the optical transmission device.

In addition, the second optical transmission device 20 shown in FIG. 1 gives the laser diode LD21 an instruction to generate an adjustment optical signal, and also issues an instruction to switch connection of the switch SW2 in order to transmit the adjustment optical signal generated by the laser diode LD21 to the reception-side optical amplifier AR12 in the first optical transmission device 10 through the transmission path F21 at the time of booting thereof.

Here, the reception-side optical amplifier AR21 shown in FIG. 1 detects the optical level of the adjustment optical signal received from the first optical transmission device 10 so as to detect a transmission loss on the basis of an amount of attenuation calculated from the optical level. The reception-side optical amplifier AR21 automatically performs setting for gain adjustment necessary for amplifying the optical level of optical signals to be received from the first optical transmission device 10 thereafter with reference to the transmission loss of the detected adjustment optical signal. Then, the reception-side optical amplifier AR21 splits a gain-adjustment-completion signal for notifying completion of gain adjustment with the optical coupler C21 to the OSC unit OS22. The OSC unit OS22 sends the gain-adjustment-completion signal to the OSC unit OS11 through the optical coupler C24 and the optical coupler C13. The OSC unit OS11 sends the gain-adjustment-completion signal to the reception-side optical amplifier AR12.

In addition, the reception-side optical amplifier AR12 shown in FIG. 1 detects the optical level of the adjustment optical signal received from the second optical transmission device 20 so as to detect a transmission loss on the basis of an amount of attenuation calculated from the optical level. The reception-side optical amplifier AR12 automatically performs setting for gain adjustment necessary for amplifying the optical level of optical signals to be received from the second optical transmission device 20 thereafter with reference to the transmission loss of the detected adjustment optical signal. Then, the reception-side optical amplifier AR12 splits a gain-adjustment-completion signal for notifying completion of gain adjustment with the optical coupler C13 to the OSC unit OS11. The OSC unit OS11 sends the gain-adjustment-completion signal to the OSC unit OS22 through the optical coupler C12 and the optical coupler C21. The OSC unit OS22 sends the gain-adjustment-completion signal to the reception-side optical amplifier AR21.

Then, an optical transmission device in the embodiment 1 controls the transmission so that transmission of the adjustment optical signal is stopped when the optical transmission device receives the gain-adjustment-completion signal from the reception-side optical amplifier at the next node. More specifically, upon the reception-side optical amplifier AR12 receiving a gain-adjustment-completion signal notified by the reception-side optical amplifier AR21, the first optical transmission device 10 gives the laser diode LD11 an instruction to stop generating the adjustment optical signal, and issues an instruction to switch connection of the switch SW1 so that the wavelength multiplexing section M11 and the transmission path F12 are connected in order to perform normal optical signal transmission.

In addition, upon the reception-side optical amplifier AR21 receiving a gain-adjustment-completion signal notified by the reception-side optical amplifier AR12, the second optical transmission device 20 gives the laser diode LD21 an instruction to stop generating the adjustment optical signal, and issues an instruction to switch connection of the switch SW2 so that the wavelength multiplexing section M22 and the transmission path F21 are connected in order to perform normal optical signal transmission.

Accordingly, in an optical transmission device in the embodiment 1, a reception-side optical amplifier at the next node can receive an adjustment optical signal and perform gain adjustment for the transmission loss even if a transmission-side optical amplifier conventionally provided in an optical transmission device is removed. As described above as a major feature, it is possible to restrain a cost for equipment investment of an optical transmission device that performs short-and-intermediate-distance optical signal transmission.

Configuration of Optical Transmission Device in Embodiment 1

Figure 2:
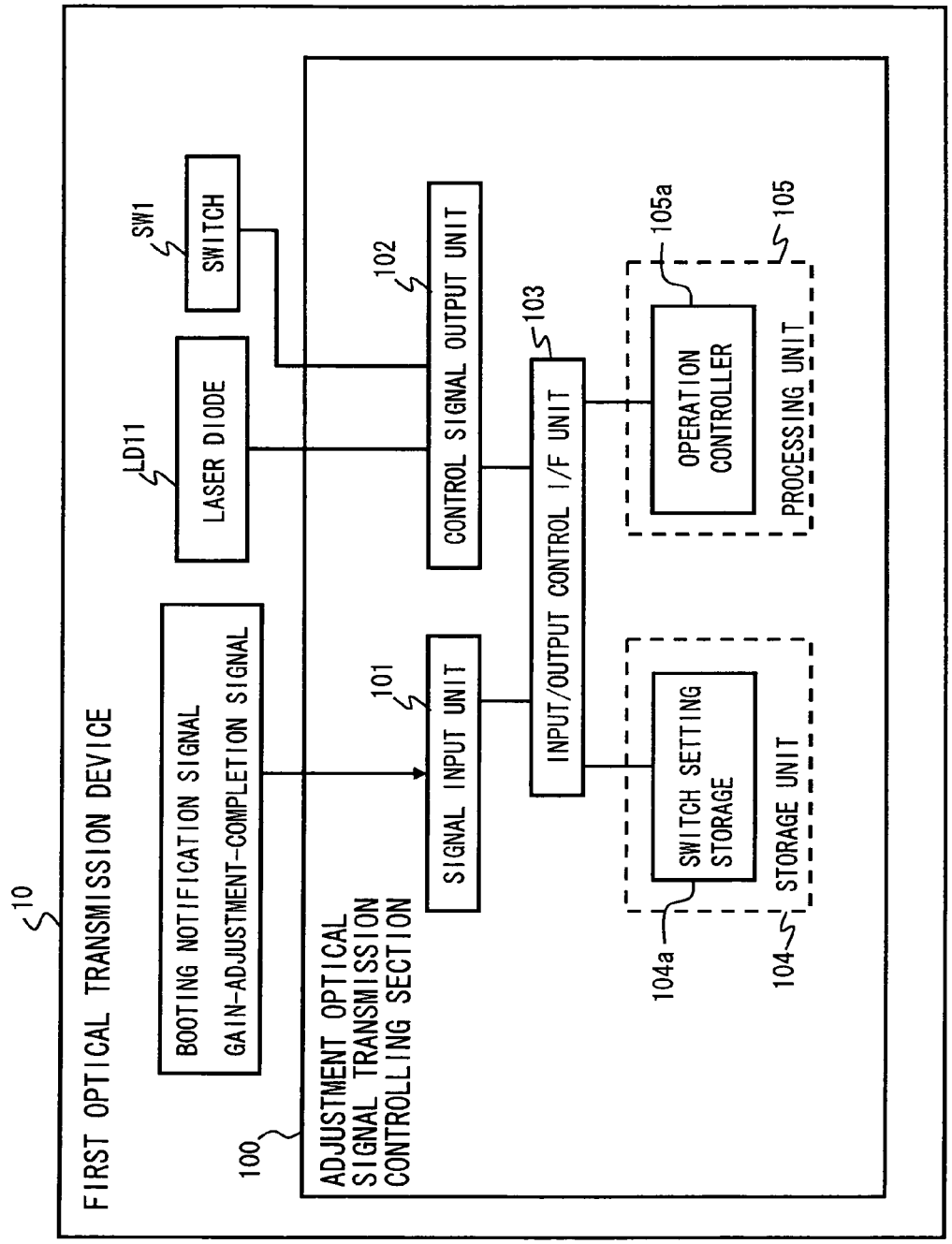
FIG. 2 is a schematic block diagram showing a configuration of an optical transmission device of the first embodiment of the invention.

An optical transmission device in the embodiment 1 will be described next using FIG. 2. FIG. 2 is a block diagram showing a configuration of an optical transmission device in the embodiment 1.

As shown in FIG. 2, the first optical transmission device 10 in the embodiment 1 further includes an adjustment optical signal transmission controlling section 100. The adjustment optical signal transmission controlling section is connected to the laser diode LD11 and the switch SW1. Meanwhile, the adjustment optical signal transmission controlling section 100 corresponds to "adjustment optical signal transmission controlling means."

The adjustment optical signal transmission controlling section 100 is constituted by a signal input unit 101, a control signal output unit 102, an input/output control I/F unit 103, a storage unit 104, and a processing unit 105.

The signal input unit inputs signals used for processing by the processing unit 105. For example, the signal input unit 101 inputs a "booting notification signal" of the first optical transmission device 10, and inputs a "gain-adjustment-completion signal" from the second optical transmission device 20.

The control signal output unit 102 outputs a control signal that is a result of the processing by the processing unit 105 to the laser diode LD11 and the switch SW1.

The input/output control I/F unit 103 controls data transfer between the storage unit 104 and the processing unit 105.

The storage unit 104 includes a switch setting storage 104*a*. The switch setting storage 104*a* stores a switch setting of the switch SW1 when the "booting notification signal" is input, and a switch setting of the switch SW1 when the "gain-adjustment-completion signal" is input.

The processing unit 105 includes an operation controller 105*a*.

Upon the "booting notification signal" being input through the input/output control I/F unit 103, the operation controller 105*a* gives the laser diode LD11 an instruction to generate an adjustment optical signal. The operation controller also outputs the switch setting "at the time of input of the booting notification signal" that the switch setting storage 104*a* stores to the switch SW1 so that the adjustment optical signal generated by the laser diode LD11 is transmitted to the reception-side optical amplifier AR21 in the second optical transmission device 20 through the transmission path F12.

In addition, upon the "gain-adjustment-completion signal" being input through the input/output control I/F unit 103, the operation controller 105*a* gives the laser diode LD11 an instruction to stop generating the adjustment optical signal. The operation controller also outputs the switch setting "at the time of input of the gain-adjustment-completion signal" that the switch setting storage 104*a* stores to the switch SW1 so that the wave multiplexing section M11 and the transmission path F12 are connected to perform normal optical signal transmission.

Although not shown in the drawing, the second optical transmission device 20 is configured in a manner similar to the first optical transmission device 10 shown in FIG. 2. At the time of booting thereof, the second optical transmission device performs processing similar to the above-described one on the laser diode LD21 and the switch SW2.

Procedure of Processing by Optical Transmission Device in Embodiment 1

Figure 3:
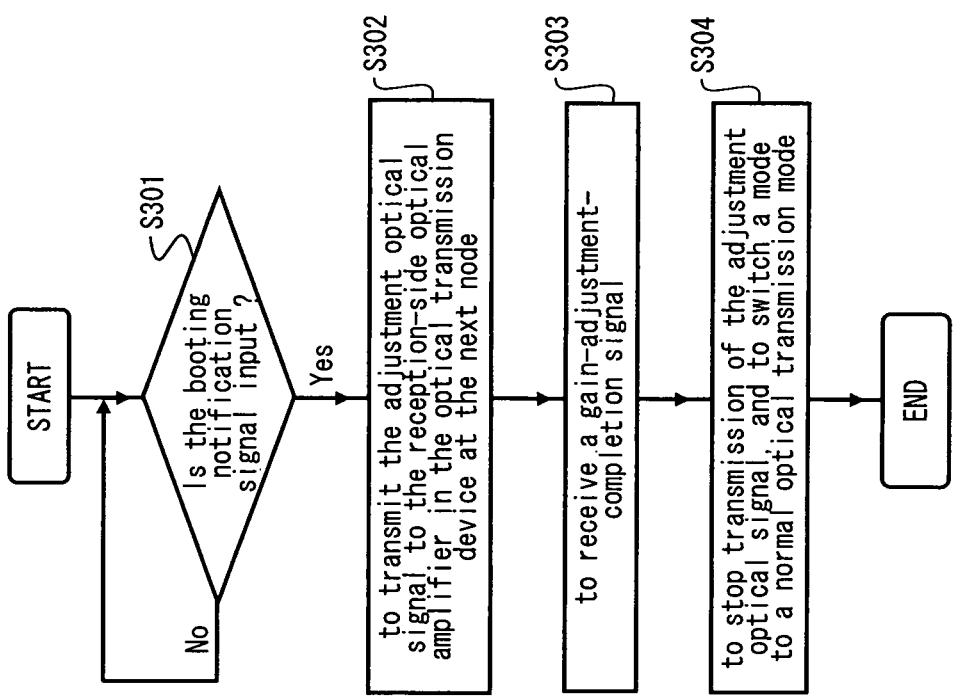
FIG. 3 is a schematic diagram for describing processing of an optical transmission device of the first embodiment of the invention.

Processing by the first optical transmission device 10 in the embodiment 1 will be described next using FIG. 3. FIG. 3 is a diagram for describing processing of an optical transmission device in the embodiment 1.

Firstly, upon the booting notification signal being input (YES of STEP S301), the operation controller 105*a* in the adjustment optical signal transmission controlling section 100 of the first optical transmission device 10 in the embodiment 1 controls the first optical transmission device to transmit the adjustment optical signal to the reception-side optical amplifier in the optical transmission device at the next node (STEP S302).

More specifically, upon the "booting notification signal" being input through the input/output control I/F unit 103, the operation controller 105*a* gives the laser diode LD11 an instruction to generate an adjustment optical signal. The operation controller also outputs the switch setting "at the time of input of the booting notification signal" that the switch setting storage 104*a* stores to the switch SW1 so that the adjustment optical signal generated by the laser diode LD11 is transmitted to the reception-side optical amplifier AR21 in the second optical transmission device 20 through the transmission path F12.

Then, upon a gain-adjustment-completion signal that the reception-side optical amplifier AR12 has received being input (STEP S303), the operation controller 105*a* stops transmission of the adjustment optical signal, and switches a mode to a normal optical transmission mode (STEP S304), and terminates the processing.

More specifically, the operation controller 105*a* gives the laser diode LD11 an instruction to stop generating the adjustment optical signal. The operation controller also outputs the switch setting "at the time of input of the gain-adjustment-completion signal" that the switch setting storage 104*a* stores to the switch SW1 so that the wavelength multiplexing section M11 and the transmission path F12 are connected to perform normal optical signal transmission.

Since a procedure of processing in the second optical transmission device 20 is similar to the procedure of the processing in the first optical transmission device 10 shown in FIG. 3, the description is omitted.

Advantages of Embodiment 1

As described above, according to the embodiment 1, an optical transmission device transmits an optical signal to an optical transmission device at the next node without amplifying the optical signal. The optical transmission device also generates an adjustment optical signal used by a reception-side optical amplifier in the optical transmission device at the next node to adjust the gain for a transmission loss of the optical signal with a low-cost laser diode. At the time of booting of the optical transmission device, the optical transmission device transmits the adjustment optical signal generated by the laser diode to the reception-side optical amplifier in the optical transmission device at the next node. When the optical transmission device receives, from the reception-side optical amplifier, a gain-adjustment-completion signal for notifying completion of gain adjustment using the adjustment optical signal, the optical transmission device controls transmission of the adjustment optical signal to be stopped. Thus, the reception-side optical amplifier at the next node can receive the adjustment optical signal and adjust the gain for the transmission loss even if a transmission-side optical amplifier conventionally provided in an optical transmission device is removed, thus it is possible to restrain a cost for equipment investment of an optical transmission device that performs short-and-intermediate-distance optical signal transmission.

Embodiment 2

In the above-described embodiment 1, a case where a laser diode generates an adjustment optical signal has been described. However, in an embodiment 2, a case where a reception-side optical amplifier generates an adjustment optical signal will be described.

Overview and Features of Optical Transmission Device in Embodiment 2

Figure 4:
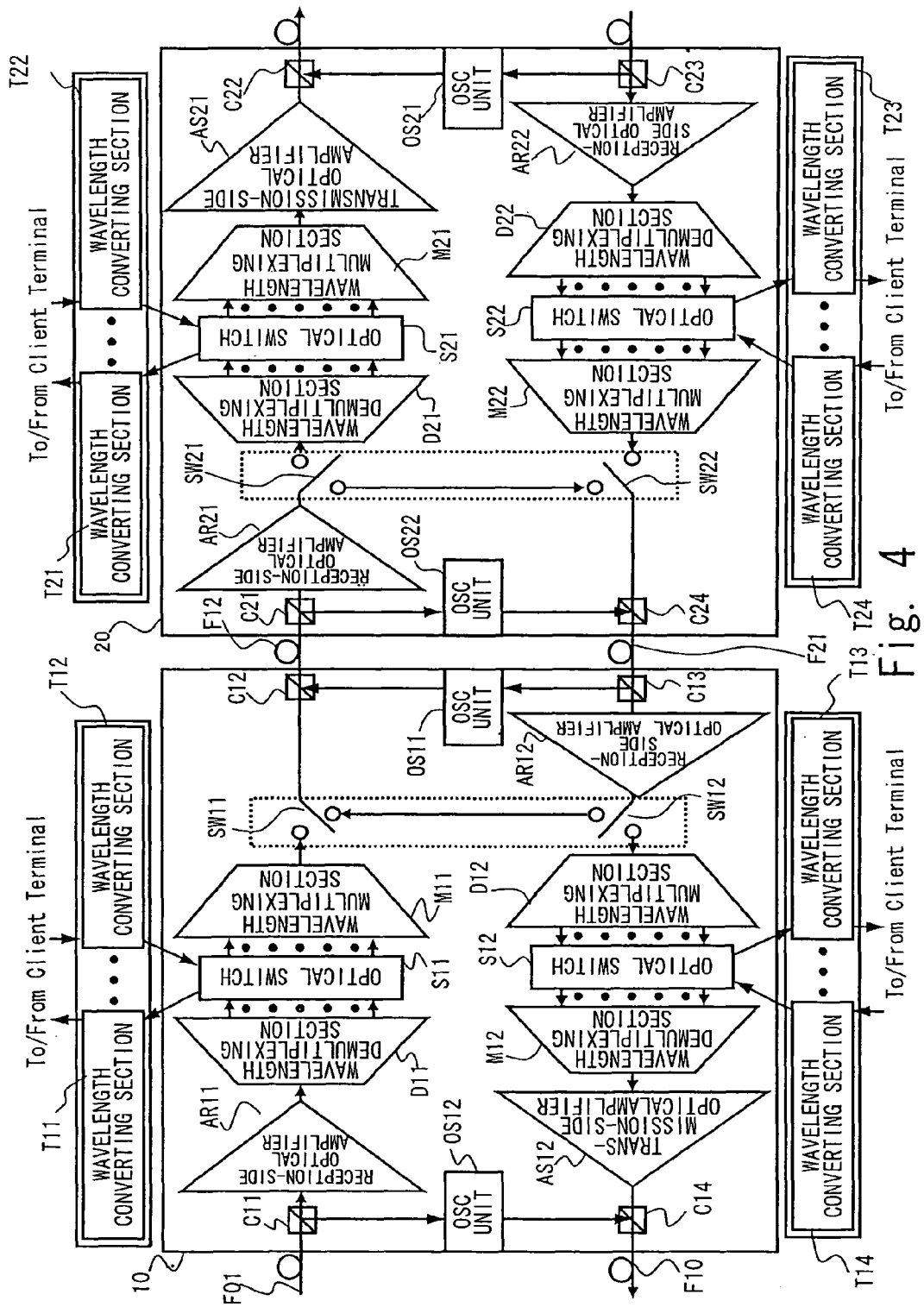
FIG. 4 is a schematic diagram for describing an overview and features of an optical transmission device of a second embodiment of the invention.

Firstly, using FIG. 4, major features of an optical transmission device in an embodiment 2 will be described specifically. FIG. 4 is a diagram for describing an overview and features of the optical transmission device in the embodiment 2.

As in the case of the embodiment 1, in the optical transmission device in the embodiment 2, as shown in FIG. 4, a transmission-side optical amplifier between a first optical transmission device 10 and a second optical transmission device 20 is removed. In addition, as in the case of the embodiment 1, an inter-node distance between the first optical transmission device 10 and the second optical transmission device 20 is a short-and-intermediate distance, and an inter-node distance between the first optical transmission device 10 and an optical transmission device at the previous node and an inter-node distance between the second optical transmission device 20 and an optical transmission device at the next node are a long distance.

An optical transmission device in the embodiment 2 generates an adjustment optical signal with a reception-side optical amplifier thereof. More specifically, the first optical transmission device 10 generates an adjustment optical signal with a reception-side optical amplifier AR12, whereas the second optical transmission device 20 generates an adjustment optical signal with a reception-side optical amplifier AR21. More specifically, the reception-side optical amplifier AR12 and the reception-side optical amplifier AR21 generate ASE light as an adjustment optical signal.

The optical transmission device in the embodiment 2 controls transmission so that the adjustment optical signal generated by the reception-side optical amplifier of the optical transmission device is transmitted to the reception-side optical amplifier in the optical transmission device at the next node. More specifically, at the time of booting thereof, the first optical transmission device 10 shown in FIG. 4 gives the reception-side optical amplifier AR12 an instruction to generate ASE light. The first optical transmission device also issues an instruction to switch connections of a switch SW11 and a switch SW12 in order to transmit the ASE light generated by the reception-side optical amplifier AR12 to the reception-side optical amplifier AR21 in the second optical transmission device 20 through a transmission path F12.

In addition, at the time of booting thereof, the second optical transmission device 20 shown in FIG. 4 gives the reception-side optical amplifier AR21 an instruction to generate ASE light. The second optical transmission device also issues an instruction to switch connections of a switch 21 and a switch SW22 in order to transmit the ASE light generated by the reception-side optical amplifier AR21 to the reception-side optical amplifier AR12 in the first optical transmission device 10 through a transmission path F21.

Here, the reception-side optical amplifier AR21 shown in FIG. 4 detects an optical level of the ASE light received from the first optical transmission device 10 to detect a transmission loss on the basis of an amount of attenuation calculated from the optical level. The reception-side optical amplifier AR21 automatically performs setting for gain adjustment necessary for amplifying the optical level of optical signals to be received from the first optical transmission device 10 thereafter with reference to the transmission loss of the detected adjustment optical signal. Then, the reception-side optical amplifier AR21 splits a gain-adjustment-completion signal for notifying completion of gain adjustment with an optical coupler C21 to an OSC unit OS22. The OSC unit OS22 sends the gain-adjustment-completion signal to an OSC unit OS11 through an optical coupler C24 and an optical coupler C13. The OSC unit OS11 sends the gain-adjustment-completion signal to the reception-side optical amplifier AR12.

Additionally, the reception-side optical amplifier AR12 shown in FIG. 4 detects an optical level of the ASE light received from the second optical transmission device 20 to detect a transmission loss on the basis of an amount of attenuation calculated from the optical level. The reception-side optical amplifier AR12 automatically performs setting for gain adjustment necessary for amplifying the optical level of optical signals to be received from the second optical transmission device 20 thereafter with reference to the transmission loss of the detected adjustment optical signal. Then, the reception-side optical amplifier AR12 splits a gain-adjustment-completion signal for notifying completion of gain adjustment with the optical coupler C13 to the OSC unit OS11. The OSC unit OS11 sends the gain-adjustment-completion signal to the OSC unit OS22 through an optical coupler C12 and the optical coupler C21. The OSC unit OS22 sends the gain-adjustment-completion signal to the reception-side optical amplifier AR21.

Then, as in the case of the embodiment 1, an optical transmission device in the embodiment 2 controls the transmission so that transmission of the adjustment optical signal is stopped when the optical transmission device receives the gain-adjustment-completion signal from the reception-side optical amplifier at the next node. More specifically, upon the reception-side optical amplifier AR12 receiving a gain-adjustment-completion signal notified by the reception-side optical amplifier AR21, the first optical transmission device 10 gives the reception-side optical amplifier AR12 an instruction to stop generating the adjustment optical signal. The first optical transmission device also issues an instruction to switch connections of the switches SW11 and SW12 so that a wavelength multiplexing section M11 and the transmission path F12 are connected and the reception-side optical amplifier AR12 and a wavelength demultiplexing section D12 are connected in order to perform normal optical signal transmission.

In addition, upon the reception-side optical amplifier AR21 receiving a gain-adjustment-completion signal notified by the reception-side optical amplifier AR12, the second optical transmission device 20 gives the reception-side optical amplifier AR21 an instruction to stop generating the adjustment optical signal. The second optical transmission device also issues an instruction to switch connections of the switches SW22 and SW21 so that a wavelength multiplexing section M22 and the transmission path F21 are connected and the reception-side optical amplifier AR21 and a wavelength demultiplexing section D21 are connected in order to perform normal optical signal transmission.

Accordingly, in an optical transmission device in the embodiment 2, a reception-side optical amplifier at the next node can receive an adjustment optical signal from the reception-side optical amplifier of the optical transmission device and adjust the gain for the transmission loss even if a transmission-side optical amplifier conventionally provided in an optical transmission device is removed. It is possible to restrain a cost for equipment investment of an optical transmission device that is connected apart from a short-and-intermediate distance.

Configuration of Optical Transmission Device in Embodiment 2

Figure 5:
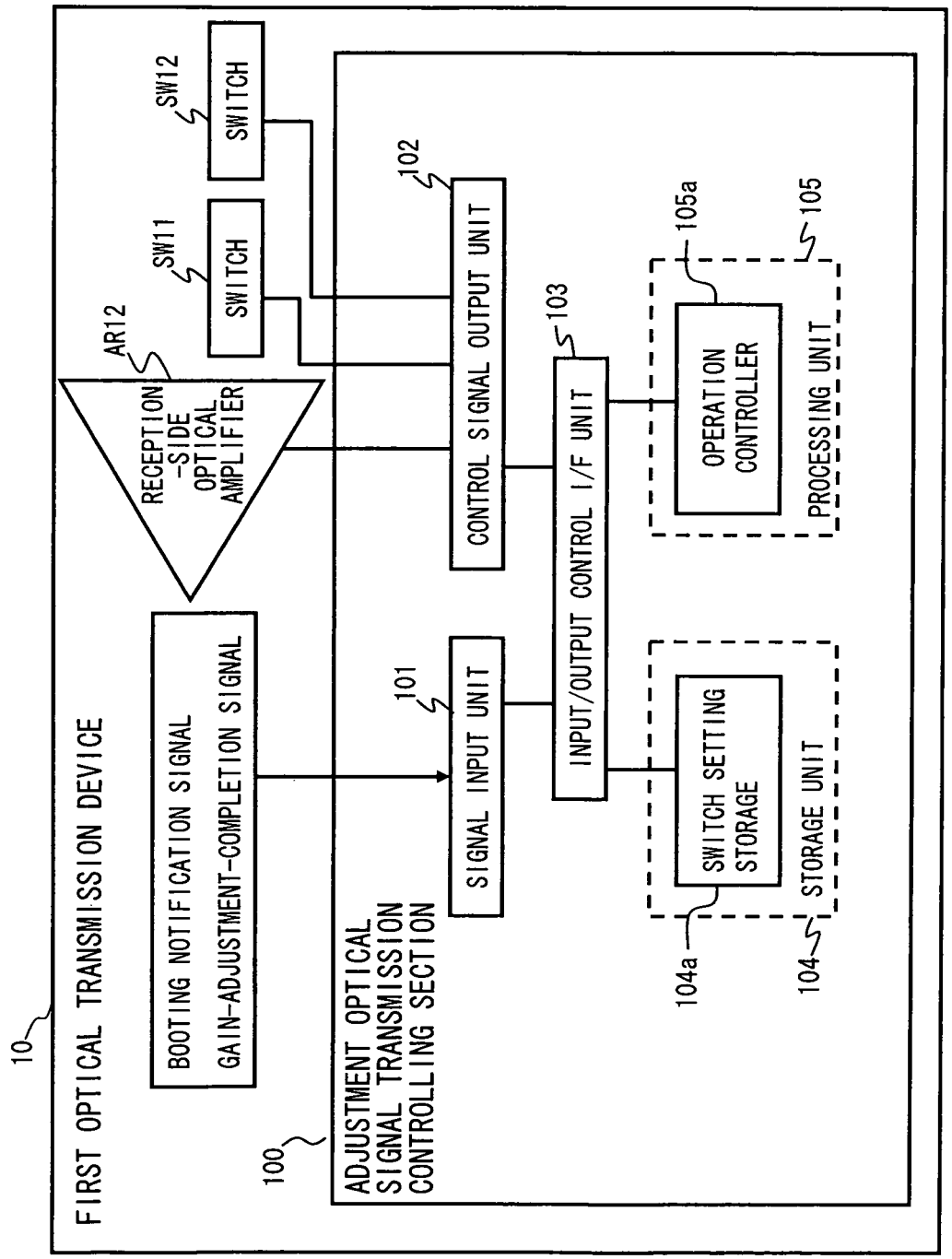
FIG. 5 is a schematic block diagram showing a configuration of an optical transmission device of the second embodiment of the invention.

An optical transmission device in the embodiment 2 will be described next using FIG. 5. FIG. 5 is a block diagram showing a configuration of an optical transmission device in the embodiment 2.

As shown in FIG. 5, the first optical transmission device 10 in the embodiment 2 includes an adjustment optical signal transmission controlling section 100 having a configuration similar to that of the first optical transmission device 10 in the embodiment 1. However, it is different that the adjustment optical signal transmission controlling section is connected to the reception-side optical amplifier AR12, the switch SW11, and the switch SW12. In the following, this will be mainly described.

A switch setting storage 104a stores switch settings of the switch SW11 and the switch SW12 when a "booting notification signal" is input, and switch settings of the switch SW11 and the switch SW12 when a "gain-adjustment-completion signal" is input.

Upon the "booting notification signal" being input through an input/output control I/F unit 103, an operation controller 105a gives the reception-side optical amplifier AR12 an instruction to generate ASE light. The operation controller also outputs the switch settings "at the time of input of the booting notification signal" that the switch setting storage 104a stores to the switch SW11 and the switch SW12 so that the adjustment optical signal generated by the reception-side optical amplifier AR12 is transmitted to the reception-side optical amplifier AR21 in the second optical transmission device 20 through the transmission path F12.

In addition, upon the "gain-adjustment-completion signal" being input through the input/output control I/F unit 103, the operation controller 105a gives the reception-side optical amplifier AR12 an instruction to stop generating the ASE light. The operation controller also outputs the switch settings "at the time of input of the gain-adjustment-completion signal" that the switch setting storage 104a stores to the switch SW11 and the switch SW12 so that the wavelength multiplexing section M11 and the transmission path F12 are connected to perform normal optical signal transmission.

Although not shown in the drawing, the second optical transmission device 20 is configured in a manner similar to the first optical transmission device 10 shown in FIG. 5. At the time of booting thereof, the second optical transmission device 20 performs processing similar to the above-described one on the reception-side optical amplifying device AR21, the switch SW21, and the switch SW22.

Procedure of Processing by Optical Transmission Device in Embodiment 2

Processing by the first optical transmission device 10 in the embodiment 2 will be described next using FIG. 3. FIG. 3 is a diagram for describing processing of an optical transmission device in the embodiment 1.

Firstly, upon a booting notification signal being input (YES of STEP S301), the operation controller 105a in the adjustment optical signal transmission controlling section 100 of the first optical transmission device 10 in the embodiment 2 controls the first optical transmission device to transmit the adjustment optical signal to the reception-side optical amplifier in the optical transmission device at the next node (STEP S302).

More specifically, upon the "booting notification signal" being input through the input/output control I/F unit 103, the operation controller 105a gives the reception-side optical amplifier AR12 an instruction to generate ASE light. The operation controller also outputs the switch settings "at the time of input of the booting notification signal" that the switch setting storage 104a stores to the switch SW11 and the switch SW12 so that the adjustment optical signal generated by the reception-side optical amplifier AR12 is transmitted to the reception-side optical amplifier AR21 in the second optical transmission device 20 through the transmission path F12.

Then, upon a gain-adjustment-completion signal that the reception-side optical amplifier AR12 has received being input (STEP S303), the operation controller 105a stops transmission of the adjustment optical signal, and switches a mode to a normal optical transmission mode (STEP S304), and terminates the processing.

More specifically, upon the "gain-adjustment-completion signal" being input through the input/output control I/F unit 103, the operation controller 105a gives the reception-side optical amplifier AR12 an instruction to stop generating the ASE light. The operation controller also outputs the switch settings "at the time of input of the gain-adjustment-completion signal" that the switch setting storage 104a stores to the switch SW11 and the switch SW12 so that the wavelength multiplexing section M11 and the transmission path F12 are connected to perform normal optical signal transmission.

Since a procedure of processing in the second optical transmission device 20 in the embodiment 2 is similar to the above-described procedure of the processing in the first optical transmission device 10, the description is omitted.

Advantages of Embodiment 2

As described above, according to the embodiment 2, a reception-side optical amplifier of an optical transmission device generates ASE light, and the optical transmission device transmits the ASE light generated by the reception-side optical amplifier to a reception-side optical amplifier in an optical transmission device at the next node. Thus, the reception-side optical amplifier at the next node can receive the adjustment optical signal from the reception-side optical amplifying device of the optical transmission device and adjust the gain for the transmission loss even if a transmission-side optical amplifier conventionally provided in an optical transmission device is removed, thus it is possible to further restrain a cost for equipment investment of an optical transmission device that is connected apart from a short-and-intermediate distance.

Embodiment 3

In the above-described embodiment 1, a case where an adjustment optical signal having an optical power corresponding to one wave is generated by a laser diode has been described. However, in an embodiment 3, a case where adjustment optical signals having a plurality of wavelengths are generated by a variable-wavelength laser diode will be described.

Overview and Features of Optical Transmission Device in Embodiment 3

Figure 6:
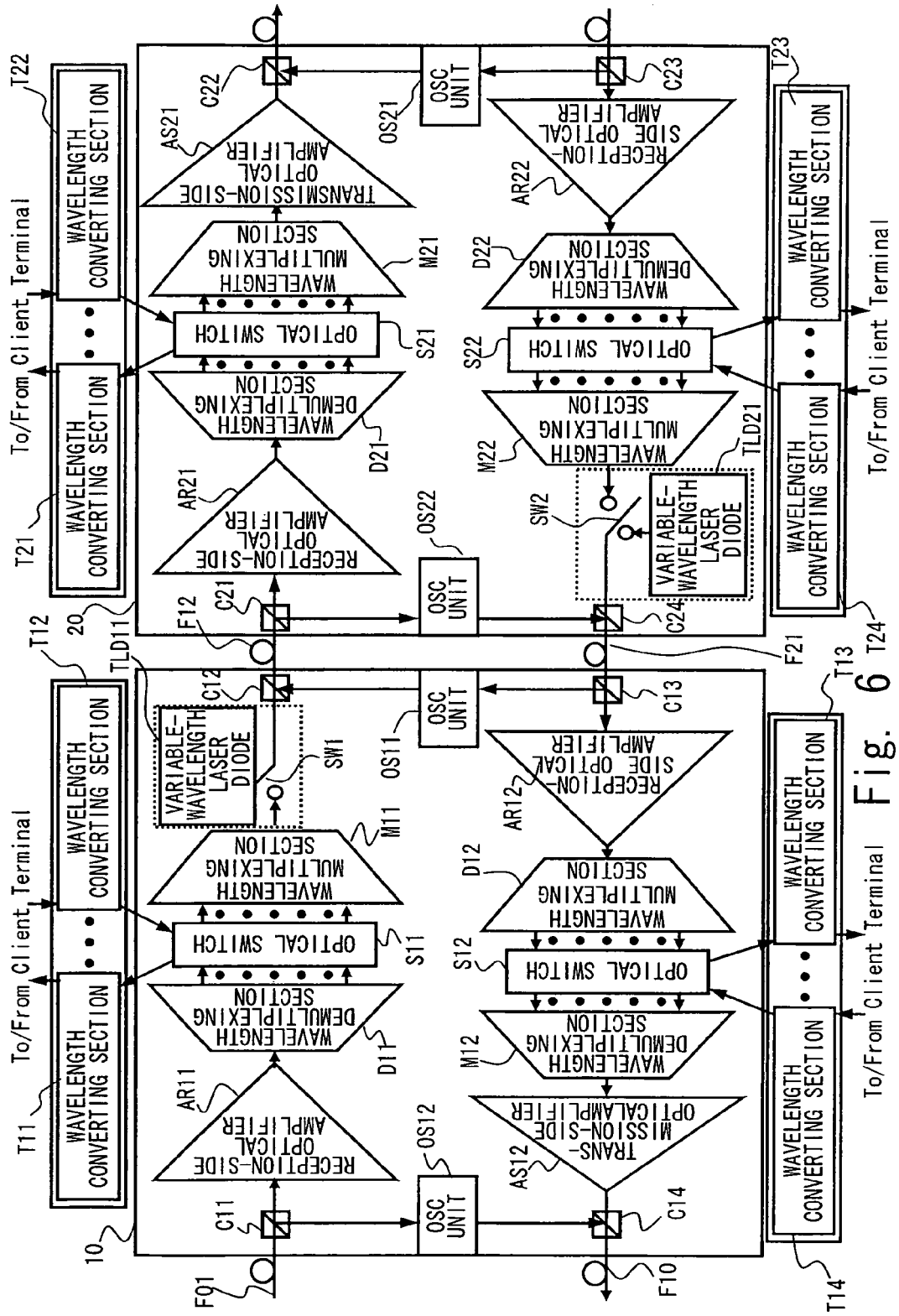
FIG. 6 is a schematic diagram for describing an overview and features of an optical transmission device of a third embodiment of the invention.

Firstly, using FIG. 6, major features of an optical transmission device in an embodiment 3 will be described specifically. FIG. 6 is a diagram for describing an overview and features of the optical transmission device in the embodiment 3.

As in the case of the embodiment 1 and the embodiment 2, in the optical transmission devices in the embodiment 3, as shown in FIG. 6, a transmission-side optical amplifier between a first optical transmission device 10 and a second optical transmission device 20 is removed. In addition, as in the case of the embodiment 1 and the embodiment 2, an inter-node distance between the first optical transmission device 10 and the second optical transmission device 20 is a short-and-intermediate distance, and an inter-node distance between the first optical transmission device 10 and an optical transmission device at the previous node and an inter-node distance between the second optical transmission device 20 and an optical transmission device at the next node are a long distance.

The optical transmission device in the embodiment 3 further includes a variable-wavelength laser diode. A plurality of adjustment optical signals having different wavelengths is generated by the variable-wavelength laser diode. More specifically, as shown in FIG. 6, a variable-wavelength laser diode TLD11 is provided in the first optical transmission device 10, whereas a variable-wavelength laser diode TLD21 is provided in the second optical transmission device 20. The variable-wavelength laser diode TLD11 and the variable-wavelength laser diode TLD21 generate each of a plurality of adjustment optical signals having different wavelengths. Here, it is assumed that the variable-wavelength laser diode TLD11 and the variable-wavelength laser diode TLD21 can output all of wavelengths ($\lambda 1$ to $\lambda 40$) corresponding to 40 C-band wavelengths.

The optical transmission device in the embodiment 3 controls transmission so that each of the plurality of adjustment optical signals generated by a variable-wavelength laser diode is transmitted to a reception-side optical amplifier in an optical transmission device at the next node. The optical transmission device controls the transmission so that transmission of the adjustment optical signals is stopped when the optical transmission device receives a gain-adjustment-completion signal corresponding to the transmitted adjustment optical signal.

More specifically, at the time of booting thereof, the first optical transmission device 10 shown in FIG. 6 firstly issues an instruction to generate an adjustment optical signal having "a wavelength: $\lambda 1$" from the variable-wavelength laser diode TLD11. The first optical transmission device also issues an instruction to switch connection of a switch SW1 in order to transmit the adjustment optical signal having "the wavelength: $\lambda 1$" generated by the variable-wavelength laser diode TLD11 to a reception-side optical amplifier AR21 in the second optical transmission device 20 through a transmission path F12.

Then, if a reception-side optical amplifier AR12 in the first optical transmission device 10 receives a gain-adjustment-completion signal corresponding to the adjustment optical signal having "the wavelength: $\lambda 1$" from the reception-side optical amplifier AR21 in the second optical transmission device 20, the first optical transmission device continuously gives the variable-wavelength laser diode an instruction to generate an adjustment optical signal having "a wavelength: $\lambda 2$".

The first optical transmission device continuously performs this operation until the reception-side optical amplifier AR12 receives a gain-adjustment-completion signal corresponding to an adjustment optical signal having "a wavelength: $\lambda 40$". After the reception of the gain-adjustment-completion signal, the first optical transmission device gives the variable-wavelength laser diode TLD11 an instruction to stop generating adjustment optical signals. The first optical transmission device also issues an instruction to switch connection of the switch SW1 so that a wavelength multiplexing section M11 and the transmission path F12 are connected in order to perform normal optical signal transmission.

In addition, at the time of booting thereof, the second optical transmission device 20 shown in FIG. 6 firstly issues an instruction to generate an adjustment optical signal having "a wavelength: $\lambda 1$" from the variable-wavelength laser diode TLD21. The second optical transmission device also issues an instruction to switch connection of the switch SW2 in order to transmit the adjustment optical signal having "the wavelength: $\lambda 1$" generated by the variable-wavelength laser diode TLD21 to the reception-side optical amplifier AR12 in the first optical transmission device 10 through a transmission path F21.

Then, when the reception-side optical amplifier AR21 in the second optical transmission device 20 receives a gain-adjustment-completion signal corresponding to the adjustment optical signal having "the wavelength: $\lambda 1$" from the reception-side optical amplifier AR12 in the first optical transmission device 10, the second optical transmission device continuously issues an instruction to generate an adjustment optical signal-having "a wavelength: $\lambda 2$".

The second optical transmission device continuously performs this operation until the reception-side optical amplifier AR21 receives a gain-adjustment-completion signal corresponding to an adjustment optical signal having "a wavelength: $\lambda 40$". After the reception of the gain-adjustment-completion signal, the second optical transmission device gives the variable-wavelength laser diode TLD21 an instruction to stop generating adjustment optical signals. The second optical transmission device also issues an instruction to switch connection of the switch SW2 so that a wavelength multiplexing section M22 and the transmission path F21 are connected in order to perform normal optical signal transmission.

In the above-described embodiment, a case where all of wavelengths ($\lambda 1$ to $\lambda 40$) corresponding to 40 C-band wavelengths are generated and transmitted as adjustment optical signals has been described. However, the present invention is not limited to this, and, for example, nine waves, one out of every four waves, ($\lambda 1, \lambda 5, \lambda 9, \ldots, \lambda 37$) can be used.

Accordingly, in an optical transmission device in the embodiment 3, a reception-side optical amplifier at the next node can receive a plurality of adjustment optical signals from a variable-wavelength laser diode and adjust gain for a transmission loss by providing a low-cost variable-wavelength laser diode even if a transmission-side optical amplifier conventionally provided in an optical transmission device is removed, thus it is possible to restrain a cost for equipment investment of an optical transmission device that performs short-and-intermediate-distance optical signal transmission. In addition, it is possible to perform gain adjustment on each of the plurality of adjustment optical signals having different wavelengths from the variable-wavelength laser diode, which enables highly-reliable gain adjustment that compensates the optical level for each wavelength.

Configuration of Optical Transmission Device in Embodiment 3

Figure 7:
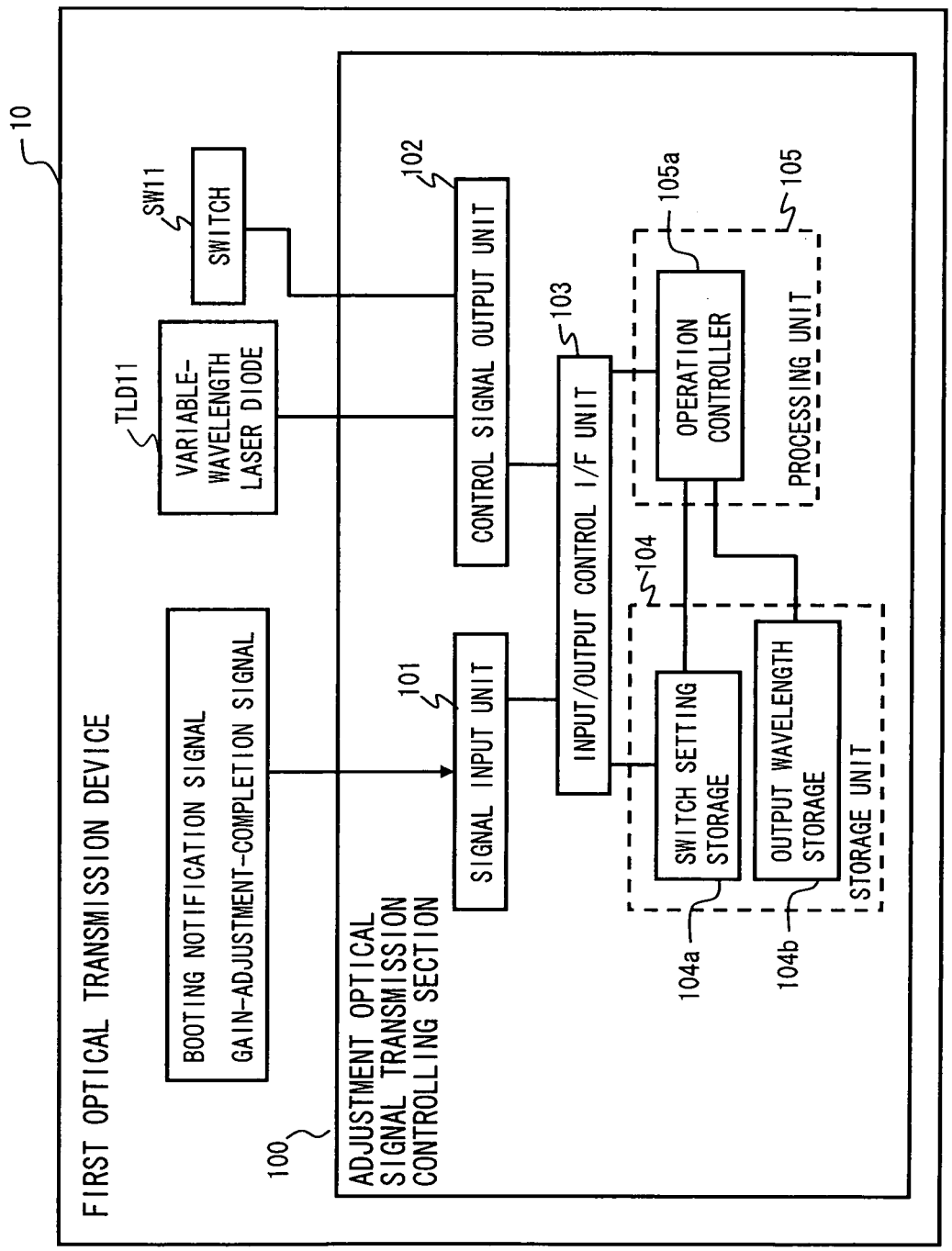
FIG. 7 is a schematic block diagram showing a configuration of the optical transmission device of the third embodiment of the invention.

The optical transmission device in the embodiment 3 will be described next using FIG. 7. FIG. 7 is a block diagram showing a configuration of the optical transmission device in the embodiment 3.

As shown in FIG. 7, the first optical transmission device 10 in the embodiment 3 includes an adjustment optical signal transmission controlling section 100 as in the case of the first optical transmission device 10 in the embodiment 1. However, it is different that the adjustment optical signal transmission controlling section 100 further includes an output wavelength storage 104b, and is connected to the variable-wavelength laser diode TLD11. In the following, this will be mainly described.

The output wavelength storage 104b stores a plurality of wavelengths that the variable-wavelength laser diode TLD21 outputs as adjustment optical signals when a "booting notification signal" is input. For example, the output wavelength storage stores that all of wavelengths (λ1 to λ40) each corresponding to 40 C-band wavelengths are output.

Upon the "booting notification signal" being input through an input/output control I/F unit 103, an operation controller 105a gives the variable-wavelength laser diode TLD11 an instruction to generate an adjustment optical signal having "a wavelength: λ1" with reference to the output wavelength storage 104b. The operation controller also outputs the switch setting "at the time of input of the booting notification signal" that a switch setting storage 104a stores to the switch SW1 so that the adjustment optical signal having "the wavelength: λ1" generated by the reception-side optical amplifier AR12 is transmitted to the reception-side optical amplifier AR21 in the second optical transmission device 20 through the transmission path F12.

In addition, when the reception-side optical amplifier AR12 receives the "gain-adjustment-completion signal" corresponding to the adjustment optical signal having "the wavelength: λ1" from the reception-side optical amplifier AR21 in the second optical transmission device 20, the operation controller 105a continuously issues an instruction to generate an adjustment optical signal having "a wavelength: λ2". The operation controller 105a repeats this operation until an adjustment optical signal having "a wavelength: λ40" is generated.

Then, upon the gain-adjustment-completion signal corresponding to the adjustment optical signal having "the wavelength: λ40" being input, the operation controller 105a gives the variable-wavelength laser diode TLD11 an instruction to stop generating the adjustment optical signal. The operation controller also outputs the switch setting "at the time of input of the gain-adjustment-completion signal" that the switch setting storage 104a stores to the switch SW1 so that the wavelength multiplexing section M11 and the transmission path F12 are connected to perform normal optical signal transmission.

Although not shown in the drawing, the second optical transmission device 20 is configured in a manner similar to the first optical transmission device 10 shown in FIG. 7. At the time of booting thereof, the second optical transmission device performs processing similar to the above-described one on the variable-wavelength laser diode TLD21 and the switch SW2.

Procedure of Processing by Optical Transmission Device in Embodiment 3

Figure 8:
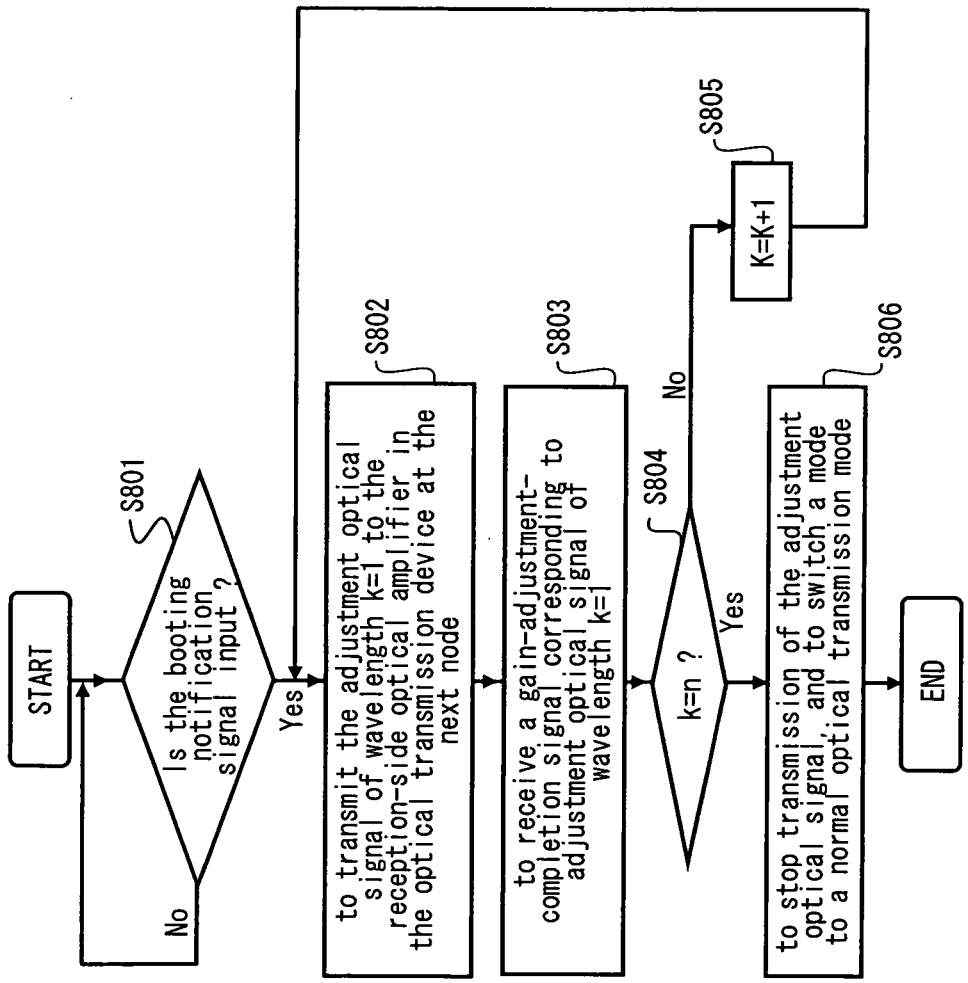
FIG. 8 is a schematic diagram for describing processing of the optical transmission device of the third embodiment of the invention.

Processing by the first optical transmission device 10 in the embodiment 3 will be described next using FIG. 8. FIG. 8 is a diagram for describing processing of an optical transmission device according to the embodiment 1.

Firstly, upon the booting notification signal being input (YES of STEP S801), the operation controller 105a in the adjustment optical signal transmission controlling section 100 of the first optical transmission device 10 in the embodiment 3 controls the variable-wavelength laser diode TLD11 to transmit an adjustment optical signal having "a wavelength: λ1" to the reception-side optical amplifier AR21 in the second optical transmission device 20.

More specifically, the operation controller 105a gives the variable-wavelength laser diode TLD11 an instruction to generate an adjustment optical signal having "a wavelength: λ1". The operation controller also outputs the switch setting "at the time of input of the booting notification signal" that the switch setting storage 104a stores to the switch SW1 so that the adjustment optical signal having "the wavelength: λ1" generated by the reception-side optical amplifier AR12 is transmitted to the reception-side optical amplifier AR21 in the second optical transmission device 20 through the transmission path F12. The operation controller controls adjustment optical signals to be transmitted to a reception-side optical amplifier in an optical transmission device at the next node (STEP S802).

Then, upon a gain-adjustment-completion signal corresponding to the adjustment optical signal having "the wavelength: λ1" that the reception-side optical amplifier AR12 has received being input (STEP S803), the operation controller 105a determines whether or not "1" corresponding to "the wavelength: λ1" matches the number of the adjustment optical signals "n" stored in the output wavelength storage 104b (STEP S804). For example, the operation controller determines whether or not "1" matches "n=40".

If "1" does not match the number of adjustment optical signals "n" (NO of STEP S804), the operation controller performs "1+1=2" (STEP S805), and continuously transmits an adjustment optical signal having "a wavelength: λ2".

If the number corresponding to the wavelength matches the number of adjustment optical signals "n" (YES of STEP S804), the operation controller stops transmission of adjustment optical signals, and switches a mode to a normal optical transmission mode (STEP S806), and terminates the processing. For example, upon a "gain-adjustment-completion signal" corresponding to the adjustment optical signal having "the wavelength: λ40" being input through the input/output control I/F unit 103, the operation controller 105a gives the variable-wavelength laser diode TLD11 an instruction to stop generating the adjustment optical signal. The operation controller also outputs the switch setting "at the time of input of the gain-adjustment-completion signal" that the switch setting storage 104a stores to the switch SW1 so that the wavelength multiplexing section M11 and the transmission path F12 are connected to perform normal optical signal transmission.

Since a procedure of processing in the second optical transmission device 20 in the embodiment 3 is similar to the above-described procedure of the processing in the first optical transmission device 10, the description is omitted.

Advantages of Embodiment 3

As described above, according to the embodiment 3, an optical transmission device further includes a variable-wavelength laser diode. The optical transmission device generates a plurality of adjustment optical signals having different wavelengths with the variable-wavelength laser diode, transmits each of the plurality of adjustment optical signals generated by the variable-wavelength laser diode to a reception-side optical amplifier in an optical transmission device at the next node. When the optical transmission device receives a gain-adjustment-completion signal corresponding to the transmitted adjustment optical signal, the optical transmission device stops transmission of the adjustment optical signal. Thus, the reception-side optical amplifier at the next node can receive the plurality of adjustment optical signals from the variable-wavelength laser diode and adjust the gain for the transmission loss by providing a low-cost variable-wavelength laser diode even if a transmission-side optical amplifier conventionally provided in an optical transmission device is removed, thus it is possible to restrain a cost for equipment investment of an optical transmission device that performs short-and-intermediate-distance optical signal transmission.

In addition, according to the embodiment 3, it is possible to perform gain adjustment on each of a plurality of adjustment optical signals having different wavelengths from the variable-wavelength laser diode, which enables highly-reliable gain adjustment that compensates the optical level for each wavelength.

Embodiment 4

In the above-described embodiment 3, a case where adjustment optical signals are generated by a newly-provided variable-wavelength laser diode has been described. However, in an embodiment 4, a case where adjustment optical signals are generated by a variable-wavelength laser diode included in a wavelength converting section will be described.

Overview and Features of Optical Transmission Device in Embodiment 4

Figure 9:
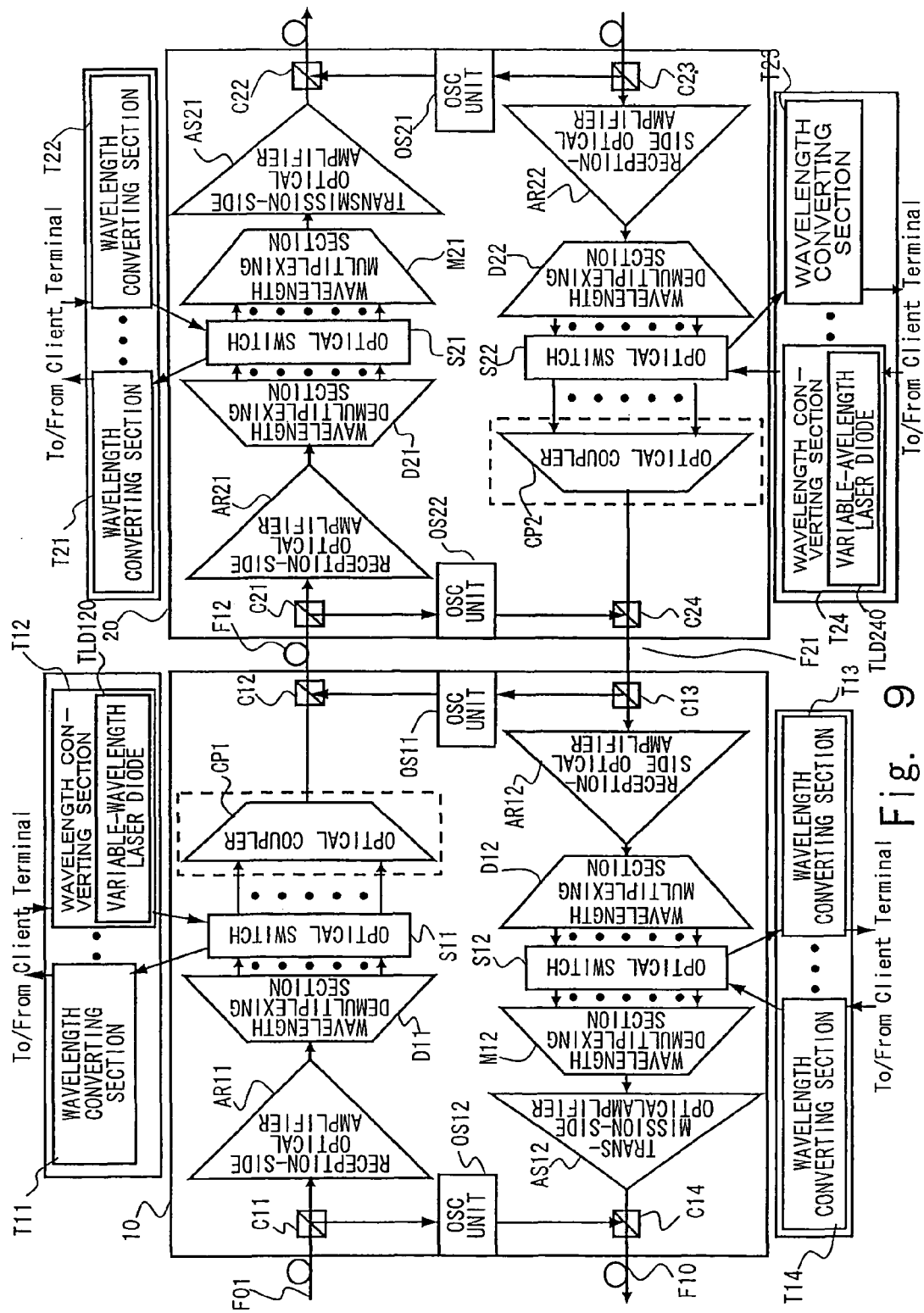
FIG. 9 is a schematic diagram for describing an overview and features of an optical transmission device of a fourth embodiment of the invention.

Firstly, using FIG. 9, major features of an optical transmission device in an embodiment 4 will be described specifically. FIG. 9 is a diagram for describing an overview and features of the optical transmission device in the embodiment 4.

As in the case of the embodiments 1 to 3, in an optical transmission device in the embodiment 4, as shown in FIG. 9, a transmission-side optical amplifier between a first optical transmission device 10 and a second optical transmission device 20 is removed. In addition, as in the case of the embodiments 1 to 3, an inter-node distance between the first optical transmission device 10 and the second optical transmission device 20 is a short-and-intermediate distance, and an inter-node distance between the first optical transmission device 10 and an optical transmission device at the previous node and an inter-node distance between the second optical transmission device 20 and an optical transmission device at the next node are a long distance.

An optical transmission device in the embodiment 4 further includes an optical coupler as a wavelength-independent wavelength multiplexing section. More specifically, as shown in FIG. 9, the first optical transmission device 10 further includes a wavelength-independent optical coupler CP1 instead of a wavelength multiplexing section M11, whereas the second optical transmission device 20 further includes a wavelength-independent optical coupler CP2 instead of a wavelength multiplexing section M22.

The optical transmission device in the embodiment 4 controls generation so that the variable-wavelength laser diode of the wavelength converting section included in the optical transmission device generates a plurality of adjustment optical signals having different wavelengths. More specifically, as shown in FIG. 9, a variable-wavelength laser diode TLD120 included in a wavelength converting section T12 connected to the first optical transmission device 10 and a variable-wavelength laser diode TLD240 included in a wavelength converting section T24 connected to the second optical transmission device 20 generate the adjustment optical signals. For example, it is assumed that the variable-wavelength laser diode TLD120 and the variable-wavelength laser diode TLD240 can output all of wavelengths ($\lambda 1$ to $\lambda 40$) each corresponding to 40 C-band wavelengths.

Then, the optical transmission device in the embodiment 4 controls transmission so that each of the plurality of adjustment optical signals generated by the variable-wavelength laser diode of the wavelength converting section is transmitted to a reception-side optical amplifier in an optical transmission device at the next node through an optical coupler. When receiving a gain-adjustment-completion signal corresponding to the transmitted adjustment optical signal, the optical transmission device controls the transmission so that transmission of the adjustment optical signal is stopped.

More specifically, at the time of booting thereof, the first optical transmission device 10 shown in FIG. 9 firstly issues an instruction to generate an adjustment optical signal having "a wavelength: $\lambda 1$" from the variable-wavelength laser diode TLD120. The first optical transmission device also issues an instruction to fix connection of an optical switch S11 in order to transmit the adjustment optical signal having "the wavelength: $\lambda 1$" generated by the variable-wavelength laser diode TLD120 to a reception-side optical amplifier AR21 in the second optical transmission device 20 through a transmission path F12.

Then, if a reception-side optical amplifier AR12 in the first optical transmission device 10 receives a gain-adjustment-completion signal corresponding to the adjustment optical signal having "the wavelength: $\lambda 1$" from the reception-side optical amplifier AR21 in the second optical transmission device 20, the first optical transmission device continuously issues an instruction to generate an adjustment optical signal having "a wavelength: $\lambda 2$".

The first optical transmission device continuously performs this operation until the reception-side optical amplifier AR12 receives a gain-adjustment-completion signal corresponding to an adjustment optical signal having "a wavelength: $\lambda 40$". After the reception of the gain-adjustment-completion signal, the first optical transmission device gives the variable-wavelength laser diode TLD120 an instruction to stop generating an adjustment optical signal. The first optical transmission device also withdraws the instruction given to the optical switch S11 to perform normal optical signal transmission.

In addition, at the time of booting thereof, the second optical transmission device 20 shown in FIG. 9 firstly issues an instruction to generate an adjustment optical signal having "a wavelength: $\lambda 1$" from the variable-wavelength laser diode TLD240. The second optical transmission device also issues an instruction to fix connection of an optical switch S22 in order to transmit the adjustment optical signal having "the wavelength: $\lambda 1$" generated by the variable-wavelength laser diode TLD240 to the reception-side optical amplifier AR12 in the first optical transmission device 10 through a transmission path F21.

Then, if the reception-side optical amplifier AR21 in the second optical transmission device 20 receives a gain-adjustment-completion signal corresponding to the adjustment optical signal having "the wavelength: $\lambda 1$" from the reception-side optical amplifier AR12 in the first optical transmission device 10, the second optical transmission device continuously issues an instruction to generate an adjustment optical signal having "a wavelength: $\lambda 2$".

The second optical transmission device continuously performs this operation until the reception-side optical amplifier AR21 receives a gain-adjustment-completion signal corresponding to an adjustment optical signal having "a wavelength: $\lambda 40$". After the reception of the gain-adjustment-completion signal, the second optical transmission device gives the variable-wavelength laser diode TLD240 an instruction to stop generating an adjustment optical signal. The first optical transmission device also withdraws the instruction given to the optical switch S22 to perform normal optical signal transmission.

In the above-described embodiment, a case where all of wavelengths ($\lambda 1$ to $\lambda 40$) corresponding to 40 C-band wavelengths are generated and transmitted as adjustment optical signals has been described. However, the present invention is not limited to this, and, for example, nine waves, one out of every four waves, ($\lambda 1, \lambda 5, \lambda 9, \ldots, \lambda 37$) can be used.

Accordingly, in an optical transmission device in the embodiment 4, a reception-side optical amplifier at the next node can receive a plurality of adjustment optical signals from a variable-wavelength laser diode of a wavelength converting section included in the optical transmission device and adjust gain for a transmission loss even if a transmission-side optical amplifier conventionally provided in an optical transmission device is removed, thus it is possible to further restrain a cost for equipment investment of an optical transmission device that performs short-and-intermediate-distance optical signal transmission. In addition, it is possible to perform gain adjustment on each of a plurality of adjustment optical signals having different wavelengths from the variable-wavelength laser diode, which enables highly-reliable gain adjustment that compensates the optical level for each wavelength.

Configuration of Optical Transmission Device in Embodiment 4

Figure 10:
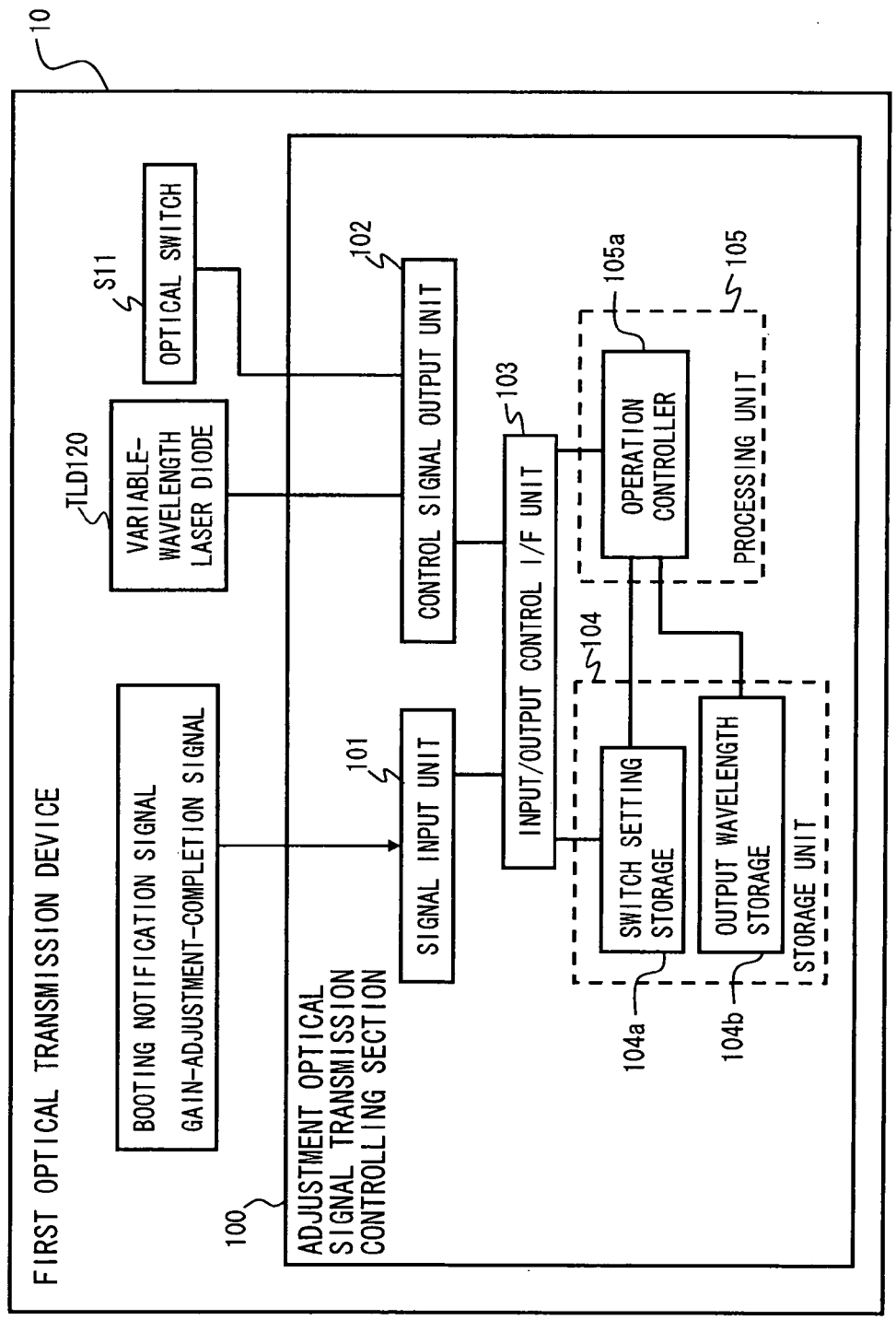
FIG. 10 is a schematic block diagram showing a configuration of the optical transmission device of the fourth embodiment of the invention.

An optical transmission device in the embodiment 4 will be described next using FIG. 10. FIG. 10 is a block diagram showing a configuration of the optical transmission device in the embodiment 4.

As shown in FIG. 10, the first optical transmission device 10 in the embodiment 4 further includes an adjustment optical signal transmission controlling section 100 having a configuration similar to that of the first optical transmission device 10 in the embodiment 3. However, content stored by a switch setting storage 104a is different. Furthermore, it is different that the adjustment optical signal transmission controlling section is connected to the variable-wavelength laser diode TLD120 and the optical switch S11. In the following, this will be mainly described.

The switch setting storage 104a stores a switch setting of the optical switch S11 when "a booting notification signal" is input, and a switch setting of the optical switch S11 when "a gain-adjustment-completion signal" is input.

Upon a "booting notification signal" being input through an input/output control I/F unit 103, an operation controller 105a gives the variable-wavelength laser diode TLD120 an instruction to generate an adjustment optical signal having "a wavelength: λ1" with reference to an output wavelength storage 104b. The operation controller also outputs the switch setting "at the time of input of the booting notification signal" that the switch setting storage 104a stores to the optical switch S11 so that the adjustment optical signal having "the wavelength: λ1" generated by the reception-side optical amplifier AR12 is transmitted to the reception-side optical amplifier AR21 in the second optical transmission device 20 through the transmission path F12.

In addition, when the reception-side optical amplifier AR12 receives a "gain-adjustment-completion signal" corresponding to the adjustment optical signal having "the wavelength: λ1" from the reception-side optical amplifier AR21 in the second optical transmission device 20, the operation controller 105a continuously issues an instruction to generate an adjustment optical signal having "a wavelength: λ2". The operation controller 105a repeats this operation until an adjustment optical signal having "a wavelength: λ40" is generated.

Then, upon a gain-adjustment-completion signal corresponding to the adjustment optical signal having "the wavelength: λ40" being input, the operation controller 105a gives the variable-wavelength laser diode TLD120 an instruction to stop generating the adjustment optical signal. The operation controller also withdraws the instruction given to the optical switch S11 to perform normal optical signal transmission.

Although not shown in the drawing, the second optical transmission device 20 is configured in a manner similar to the first optical transmission device 10 shown in FIG. 10. At the time of booting thereof, the second optical transmission device performs processing similar to the above-described one on the variable-wavelength laser diode TLD240 and the optical switch S22.

Procedure of Processing by Optical Transmission Device in Embodiment 4

Processing by the first optical transmission device 10 in the embodiment 4 will be described next using FIG. 8. FIG. 8 is a diagram for describing processing of an optical transmission device in the embodiment 3.

Firstly, upon a booting notification signal being input (YES of STEP S801), the operation controller 105a in the adjustment optical signal transmission controlling section 100 of the first optical transmission device 10 in the embodiment 4 controls the variable-wavelength laser diode TLD120 to transmit an adjustment optical signal having "a wavelength: λ1" to the reception-side optical amplifier AR21 in the second optical transmission device 20 (STEP S802).

More specifically, the operation controller 105a gives the variable-wavelength laser diode TLD120 an instruction to generate an adjustment optical signal having "a wavelength: λ1". The operation controller also outputs the switch setting "at the time of input of the booting notification signal" that the switch setting storage 104a stores to the optical switch S11 so that the adjustment optical signal having "the wavelength: λ1" generated by the reception-side optical amplifier AR12 is transmitted to the reception-side optical amplifier AR21 in the second optical transmission device 20 through the transmission path F12.

Then, upon a gain-adjustment-completion signal corresponding to the adjustment optical signal having "the wavelength: λ1" that the reception-side optical amplifier AR12 has received being input (STEP S803), the operation controller 105a determines whether or not "1" corresponding to "the wavelength: λ1" matches the number of the adjustment optical signals "n" stored in the output wavelength storage 104b (STEP S804). For example, the operation controller determines whether or not "1" matches "n=40".

If "1" does not match the number of adjustment optical signals "n" (NO of STEP S804), the operation controller performs "1+1=2" (STEP S805), and continuously transmits an adjustment optical signal having "a wavelength: λ2".

If the number corresponding to the wavelength matches the number of adjustment optical signals "n" (YES of STEP S804), the operation controller stops transmission of adjustment optical signals, and switches a mode to a normal optical transmission mode (STEP S806), and terminates the processing. For example, upon a "gain-adjustment-completion signal" corresponding to the adjustment optical signal having "the wavelength: λ40" being input through the input/output control I/F unit 103, the operation controller 105a gives the variable-wavelength laser diode TLD120 an instruction to stop generating the adjustment optical signal. The operation controller also outputs the switch setting "at the time of input of the booting notification signal" that the switch setting storage 104a stores to the optical switch S11 to perform normal optical signal transmission.

Since a procedure of processing in the second optical transmission device 20 in the embodiment 4 is similar to the above-described procedure of the processing in the first optical transmission device 10, the description is omitted.

Advantages of Embodiment 4

As described above, according to the embodiment 4, a reception-side optical amplifier at the next node can receive a plurality of adjustment optical signals from a variable-wavelength laser diode of a wavelength converting section included in an optical transmission device and adjust gain for a transmission loss even if a transmission-side optical amplifier conventionally provided in an optical transmission device is removed, thus it is possible to further restrain a cost for equipment investment of an optical transmission device that performs short-and-intermediate-distance optical signal transmission.

In addition, according to the embodiment 4, it is possible to perform gain adjustment on each of a plurality of adjustment optical signals having different wavelengths from the variable-wavelength laser diode, which enables highly-reliable gain adjustment that compensates the optical level for each wavelength.

Embodiment 5

In the above-described embodiment 4, a case where an optical coupler is provided as a wavelength-independent wavelength multiplexing section has been described. However, in an embodiment 5, a case where a wavelength-independent AWG is provided will be described.

Overview and Features of Optical Transmission Device in Embodiment 5

Figure 11:
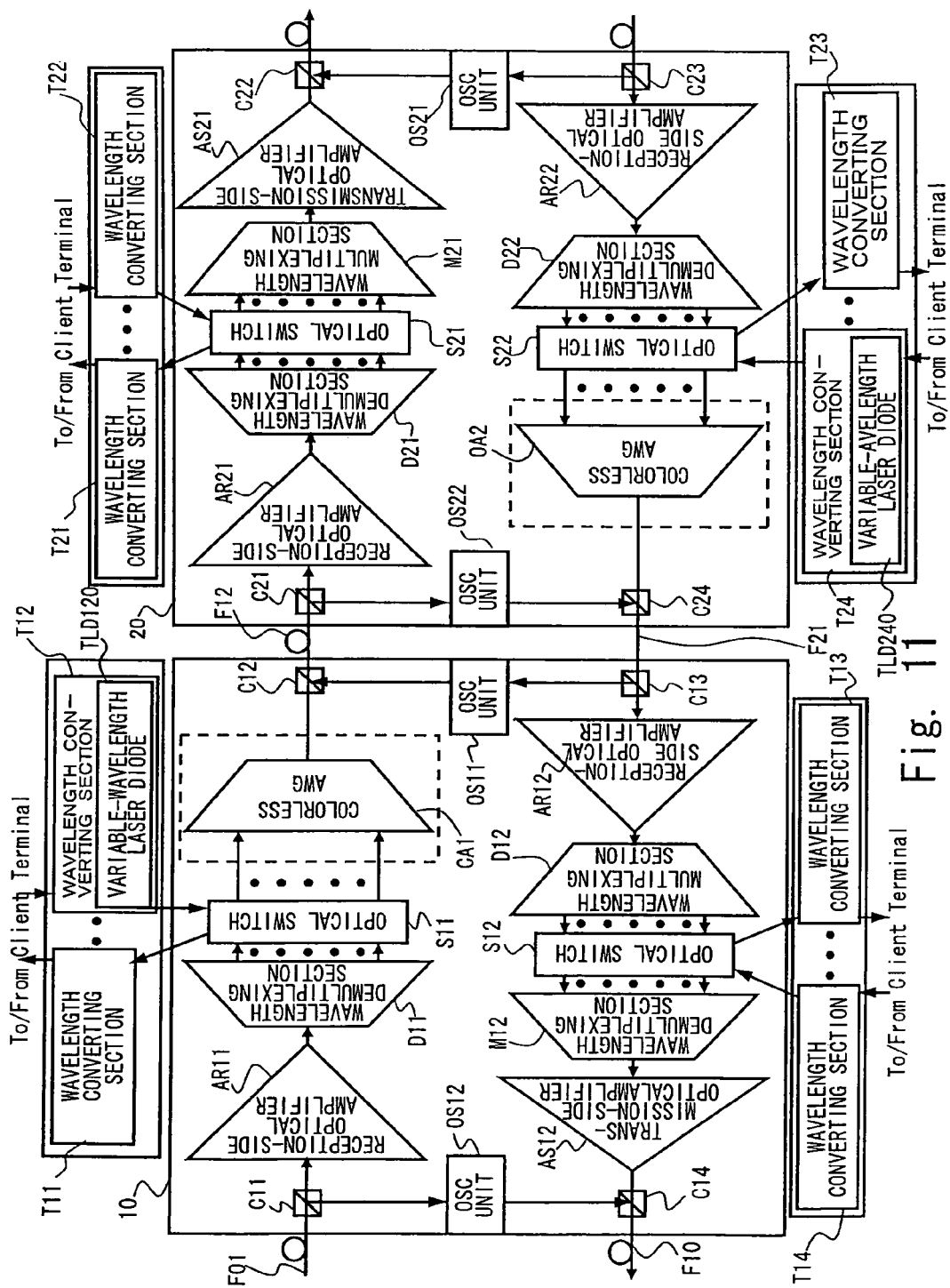
FIG. 11 is a schematic diagram for describing an overview and features of an optical transmission device of a fifth embodiment of the invention.

Firstly, using FIG. 11, major features of an optical transmission device in an embodiment 5 will be described specifically. FIG. 11 is a diagram for describing an overview and features of the optical transmission device in the embodiment 5.

As in the case of the embodiments 1 to 4, in the optical transmission device in the embodiment 5, as shown in FIG. 11, a transmission-side optical amplifier between a first optical transmission device 10 and a second optical transmission device 20 is removed. In addition, as in the case of the embodiments 1 to 3, an inter-node distance between the first optical transmission device 10 and the second optical transmission device 20 is a short-and-intermediate distance, and an inter-node distance between the first optical transmission device 10 and an optical transmission device at the previous node and an inter-node distance between the second optical transmission device 20 and an optical transmission device at the next node are a long distance.

An optical transmission device in the embodiment 5 further includes a colorless AWG as a wavelength-independent wavelength multiplexing section. More specifically, as shown in FIG. 11, the first optical transmission device 10 further includes a colorless AWG CA1 instead of a wavelength multiplexing section M11, whereas the second optical transmission device 20 further includes a colorless AWG CA2 instead of the wavelength multiplexing section M22.

Additionally, the optical transmission device in the embodiment 5, as in the case of the embodiment 4, transmits a plurality of adjustment optical signals having different wavelengths generated by a variable-wavelength laser diode TLD120 included in a wavelength converting section T12 to the second optical transmission device 20 through the colorless AWG CA1, and transmits a plurality of adjustment optical signals having different wavelengths generated by a variable-wavelength laser diode TLD240 to the first optical transmission device 10 through the colorless AWG CA2.

Accordingly, the optical transmission device in the embodiment 5 can reduce a transmission loss of adjustment optical signals than transmitting the adjustment optical signals through an optical coupler.

Since a configuration of and a procedure of processing by the optical transmission device in the embodiment 5 is similar to the configuration of and the procedure of the processing by the optical transmission device in the embodiment 4, the description is omitted.

Embodiment 6

While optical transmission devices in the embodiments 1 to 5 have been described, the present invention may be carried out in various different embodiments other than the above-described embodiments. Accordingly, in the following, various different embodiments, as an optical transmission device in the embodiment 4, will be described in (1) and (2).

(1) System Configurations and Others

Among each processing described in the above-described embodiments, all of or a part of processing having been described as that being automatically performed can be carried out manually (for example, an adjustment optical signal transmission request is not generated automatically at the time of booting, but the adjustment optical signal transmission request is received from a network administrator through a keyboard or a touch panel). Alternatively, all of or a part of processing described as that being performed manually can be carried out automatically by a known method. Other than this, for example, procedures shown in the specification and in the drawings, specific names, information including various kinds of data and parameters (such as, for example, the content stored by the output wavelength storage 104*b*) can be freely changed expect for cases specially mentioned.

In addition, each element of each device shown in the drawings is functionally conceptual one, and is not necessarily physically configured as shown in the drawings. That is, specific configurations (such as, for example, a configuration of FIG. 7) of distributing or integrating each processing unit and each storage unit are not limited to the illustrated ones. All of or a part of processing units and storage units are configured to be functionally or physically distributed or integrated in a given unit according to various kinds of loads and usage, for example, by integrating the switch setting storage 104*a* and the output wavelength storage 104*b*. Furthermore, all of or a given part of processing functions performed by each device can be realized by a CPU and programs analyzed and executed by the CPU, or can be realized as hardware using wired logic.

(2) Self Position Estimating Program

Figure 12:
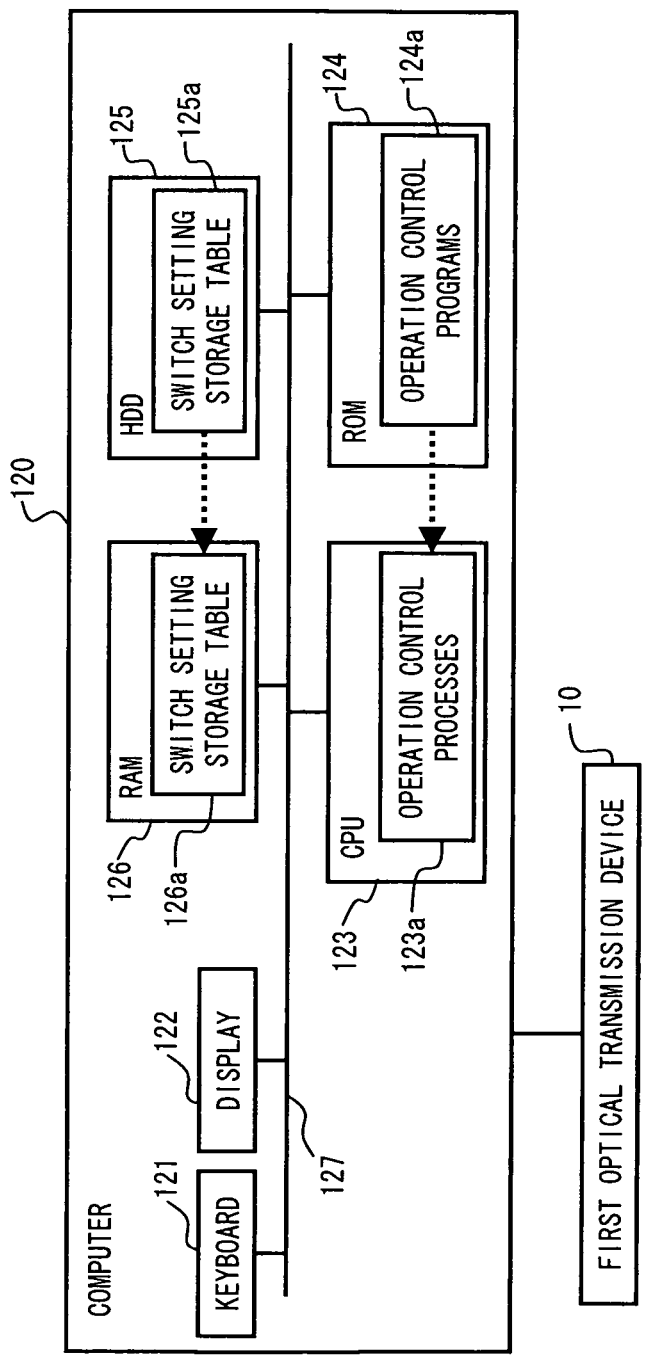
FIG. 12 is a schematic diagram showing a computer that executes an optical transmission program of the first embodiment of the invention.
Figure 13:
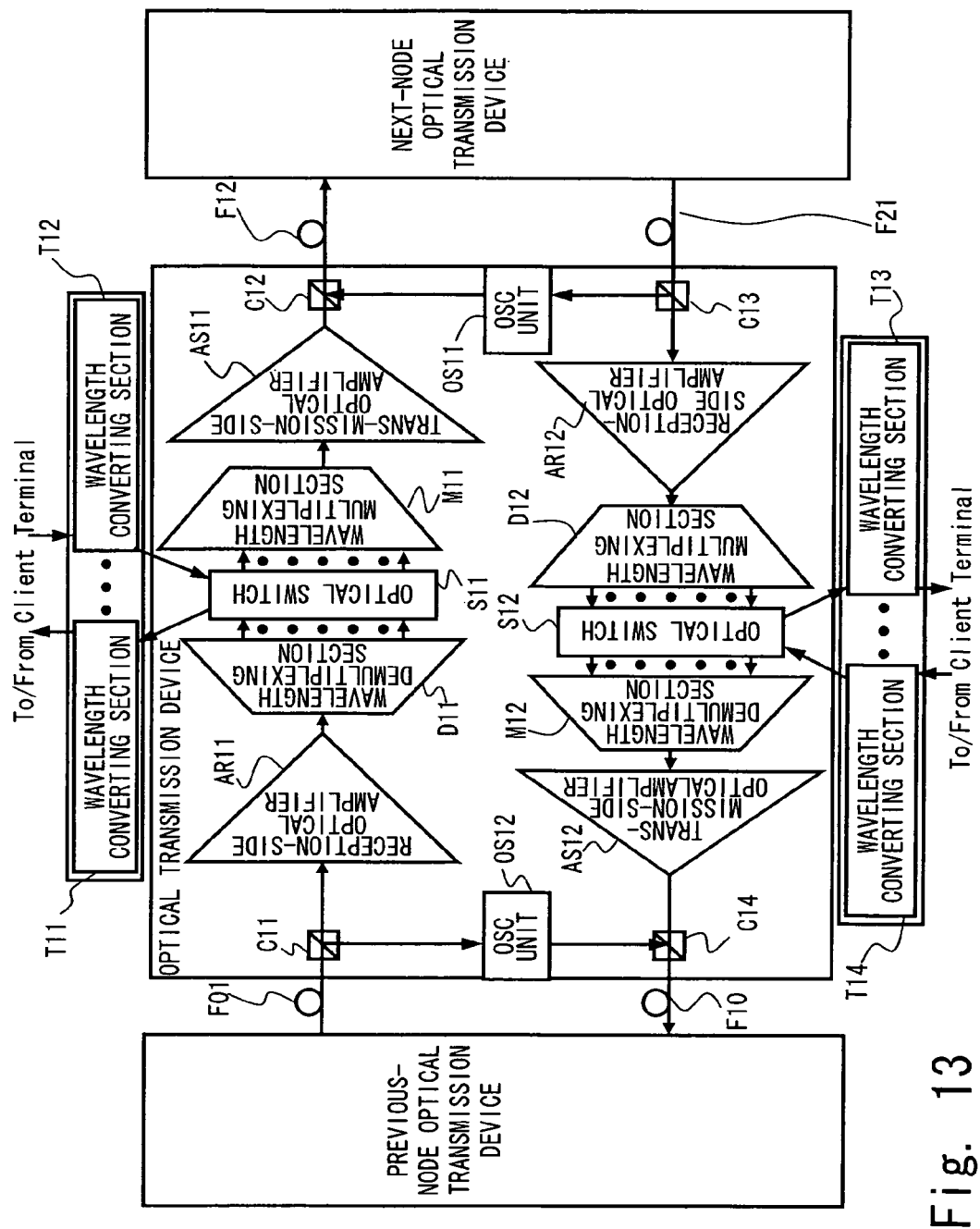
FIG. 13 is a schematic diagram for describing a conventional optical transmission device.

Meanwhile, in the above-described embodiments 1 to 5, a case where each kind of processing is realized by a hardware logic has been described. However, the present invention is not limited to this, and prepared programs may be executed by a computer. Accordingly, in the following, an example of a computer that executes an optical transmission program having functions similar to the first optical transmission device 10 shown in the above-described embodiment 1 will be described using FIG. 12. FIG. 12 is a diagram showing a computer that executes an optical transmission program in the embodiment 1.

As shown in FIG. 12, a computer 120 as an information processing apparatus is constituted by a keyboard 121, a display 122, a CPU 123, a ROM 124, an HDD 125, and a RAM 126, which are connected through a bus 127 or the like, and is further connected to the first optical transmission device 10.

The ROM 124 prestores an optical transmission program that demonstrates functions similar to those of an adjustment optical signal transmission controlling section 100 shown in the above-described embodiment 1, namely, operation control programs 124a, as shown in FIG. 12. These programs 124a may be appropriately distributed as in the case of each element of the optical transmission device 10 shown in FIG. 2.

The CPU 123 reads out these programs 124a from the ROM 124 and executes the programs, whereby the programs 124a function as operation control processes 123a, as shown in FIG. 12. Meanwhile, the operation control processes 123a correspond to the operation controller 105a shown in FIG. 2.

In addition, as shown in FIG. 12, a switch setting storage table 125a is provided in the HDD 125. This switch setting storage table 125a corresponds to the switch setting storage 104a used in FIG. 2. Then, the CPU 123 registers a switch setting storage table 126a for the switch setting storage table 125a, reads out this switch setting storage table 126a to store it in the RAM 126, and executes optical transmission processing on the basis of the switch setting storage table 126a stored in the RAM 126.

Meanwhile, the above-described programs 124a are not necessarily prestored in the ROM 124. For example, each program may be stored on "portable physical media" such as a flexible disc (FD), a CD-ROM, an MO disc, a DVD, a magneto-optical disc, and an IC card that are inserted into the computer 120, or on "fixed physical media" such as an HDD provided inside and outside of the computer 120, or on "other computers (or servers)" connected to the computer 120 through a public line, the Internet, a LAN, and a WAN, and the computer 120 may read out each program from these, and execute the program.

What is claimed is:

1. An optical transmission device capable of transmitting and receiving an optical signal with a next optical transmission device, the optical transmission device comprising:
   an optical transmitter for transmitting individually an adjustment optical signal and the optical signal, the optical signal being transmitted to the next optical transmission device without amplifying the optical signal, the adjustment optical signal having a predetermined optical level, the next optical transmission device adjusting gain for a transmission loss of the optical signal based on a loss of the adjustment optical signal during a transmission of the adjustment optical signal between the optical transmission device and the next optical transmission device; and
   an optical signal controller for sending instructions to the optical transmitter, one of the instructions being sent so as to stop transmission of the adjustment optical signal on the basis of a reception signal transmitted by the next optical transmission device, the reception signal being transmitted after calculation of an amount of loss of the adjustment optical signal during propagation from the optical transmission device to the next optical transmission device.

2. The optical transmission device according to claim 1, further comprising:
   a receiver for receiving another adjustment optical signal transmitted from the next optical transmission device; and
   an optical amplifier for amplifying the optical signal transmitted from the next optical transmission device based on a value corresponding to another amount of loss of the other adjustment optical signal transmitted from the next optical transmission device.

3. An optical transmission device that is installed at a node of a network and connected to a next node, and that performs transmission of an optical signal, the optical transmission device comprising:
   a transmitter configured to transmit individually the optical signal and an adjustment optical signal to
      an optical transmission device at the next node without amplifying the optical signal;
      an adjustment optical signal generator configured to generate the adjustment optical signal used by a reception-side optical amplifier in the other optical transmission device at the next node to adjust gain for a transmission loss of the optical signal; and
      an adjustment optical signal transmission controller configured to control the transmitter to transmit the adjustment optical signal generated by the adjustment optical signal generator to the reception-side optical amplifier in the other optical transmission device at the next node, and to stop transmission of the adjustment optical signal when the optical transmission device receives, from the reception-side optical amplifier, a gain-adjustment-completion signal for notifying completion of gain adjustment using the adjustment optical signal.

4. The optical transmission device according to claim 3, further comprising a laser diode,
   wherein the adjustment optical signal generator is configured to generate the adjustment optical signal using the laser diode, and
   wherein the adjustment optical signal transmission controller is configured to control the transmitter and the adjustment optical signal generator to transmit the adjustment optical signal generated by the laser diode to the reception-side optical amplifier in the other optical transmission device at the next node.

5. The optical transmission device according to claim 3, wherein the adjustment optical signal generator generates the adjustment optical signal with a reception-side optical amplifier in the optical transmission device, and
   wherein the adjustment optical signal transmission controller controls the transmitter to transmit the adjustment optical signal generated by the reception-side optical amplifier of the optical transmission device to the reception-side optical amplifier in the optical transmission device at the next node.

6. The optical transmission device according to claim 3, further comprising a wavelength-converting laser diode,
   wherein the adjustment optical signal generator generates a plurality of adjustment optical signals having different wavelengths with the wavelength-converting laser diode, and
   wherein the adjustment optical signal transmission controls the transmitter to transmit each of the plurality of adjustment optical signals generated by the wavelength-converting laser diode to the reception-side optical amplifier in the optical transmission device at the next node, and to stop transmission of the adjustment optical signals when the optical transmission device receives the gain-adjustment-completion signal corresponding to the transmitted adjustment optical signal.

7. The optical transmission device according to claim 3, further comprising a wavelength-independent wavelength multiplexing section, wherein the adjustment optical signal generator generates a plurality of adjustment optical signals having different wavelengths with the variable-wavelength laser diode of a wavelength converting section included in the optical transmission device, and wherein the adjustment optical signal transmission controller controls the transmitter to transmit each of the plurality of adjustment optical signals generated by the variable-wavelength laser diode of the wavelength converting section included in the optical transmission device to the reception-side optical amplifier in the optical transmission device at the next node through the wavelength-independent wavelength multiplexing section, and to stop transmission of the adjustment optical signals when the optical transmission device receives the gain-adjustment-completion signal corresponding to the transmitted adjustment optical signal.

8. An optical transmission method that is installed at a node of a network and that performs transmission of an optical signal, the optical transmission method comprising:
  transmitting individually the optical signal and an adjustment optical signal to an optical transmission device at a next node without amplifying the optical signal;
  generating the adjustment optical signal used by a reception-side optical amplifier in the optical transmission device at the next node to adjust gain for a transmission loss of the optical signal; and
  controlling transmission of the adjustment optical signal to the reception-side optical amplifier in the optical transmission device at the next node, so that the transmission of the adjustment optical signal is stopped when the node receives, from the reception-side optical amplifier, a gain-adjustment-completion signal for notifying completion of gain adjustment using the adjustment optical signal.

9. A non-transitory computer readable storage medium having an optical transmission program causing a computer, serving as an optical transmission device that is installed at a node of a network and that performs transmission of an optical signal to execute an optical transmission method comprising:
  transmitting individually the optical signal and an adjustment optical signal to another optical transmission device at the next node without amplifying the optical signal;
  generating the adjustment optical signal used by a reception-side optical amplifier in the optical transmission device at the next node to adjust gain for a transmission loss of the optical signal; and
  controlling transmission of the adjustment optical signal to the reception-side optical amplifier in the other optical transmission device at the next node, and so that transmission of the adjustment optical signal is stopped when the optical transmission device receives, from the reception-side optical amplifier, a gain-adjustment-completion signal for notifying completion of gain adjustment using the adjustment optical signal.

\* \* \* \* \*